United States Patent
Strano et al.

(10) Patent No.: US 6,719,147 B2
(45) Date of Patent: Apr. 13, 2004

(54) SUPPORTED MESOPOROUS CARBON ULTRAFILTRATION MEMBRANE AND PROCESS FOR MAKING THE SAME

(75) Inventors: Michael Strano, Wilmington, DE (US); Henry C. Foley, State Collage, PA (US); Hans Agarwal, Newark, DE (US)

(73) Assignee: The University of Delaware, Newark, DE (US)

( * ) Notice: Subject to any disclaimer, the term of this patent is extended or adjusted under 35 U.S.C. 154(b) by 0 days.

(21) Appl. No.: 09/844,567

(22) Filed: Apr. 27, 2001

(65) Prior Publication Data

US 2003/0034295 A1 Feb. 20, 2003

(51) Int. Cl.$^7$ ............................................... B01D 29/00
(52) U.S. Cl. ................... 210/490; 210/650; 210/500.22; 96/11; 264/29.1; 264/29.6; 423/447.1
(58) Field of Search ................................ 210/490, 650, 210/500.22, 500.27; 96/11, 4, 12; 95/54, 45, 50, 51, 96, 139, 140, 143; 55/524, 158, 16; 423/447.1, 447.2, 447.7, 447.9, 449; 264/29.1, 29.6

(56) References Cited

U.S. PATENT DOCUMENTS

| | | | |
|---|---|---|---|
| 3,615,024 A | 10/1971 | Michaels | 210/490 |
| 4,451,424 A | 5/1984 | Tweddle et al. | 264/216 |
| 4,685,940 A | * 8/1987 | Soffer et al. | 423/445 R |
| 4,919,860 A | 4/1990 | Schindler et al. | 264/29.1 |
| 4,954,381 A | 9/1990 | Cabasso et al. | 428/116 |
| 5,028,337 A | * 7/1991 | Linder et al. | 210/500.27 |
| 5,104,425 A | * 4/1992 | Rao et al. | 55/DIG. 5 |
| 5,435,836 A | * 7/1995 | Anand et al. | 95/139 |
| 5,480,554 A | 1/1996 | Degen et al. | 210/651 |
| 5,972,079 A | 10/1999 | Foley et al. | 96/11 |

OTHER PUBLICATIONS

Zydney and Zeman (1996), Microfiltration and Ultrafiltration—Principles and Applications, Ch. 7 & 9, Marcel Dekker, New York, NY, pp. 350–379, pp. 397–437.

(List continued on next page.)

*Primary Examiner*—Joseph Drodge
*Assistant Examiner*—Krishnan S Menon
(74) *Attorney, Agent, or Firm*—Connolly Bove Lodge & Hutz LLP

(57) ABSTRACT

A novel supported mesoporous carbon ultrafiltration membrane and process for producing the same. The membranes comprise a mesoporous carbon layer that exists both within and external to the porous support. A liquid polymer precursor composition comprising both carbonizing and noncarbonizing templating polymers is deposited on the porous metal support. The coated support is then heated in an inert-gas atmosphere to pyrolyze the polymeric precursor and form a mesoporous carbon layer on and within the support. The pore-size of the membranes is dependent on the molecular weight of the noncarbonizing templating polymer precursor. The mesoporous carbon layer is stable and can withstand high temperatures and exposure to organic chemicals. Additionally, the porous metal support provides excellent strength properties. The composite structure of the membrane provides novel structural properties and allows for increased operating pressures allowing for greater membrane flow rates.

Figure 1:
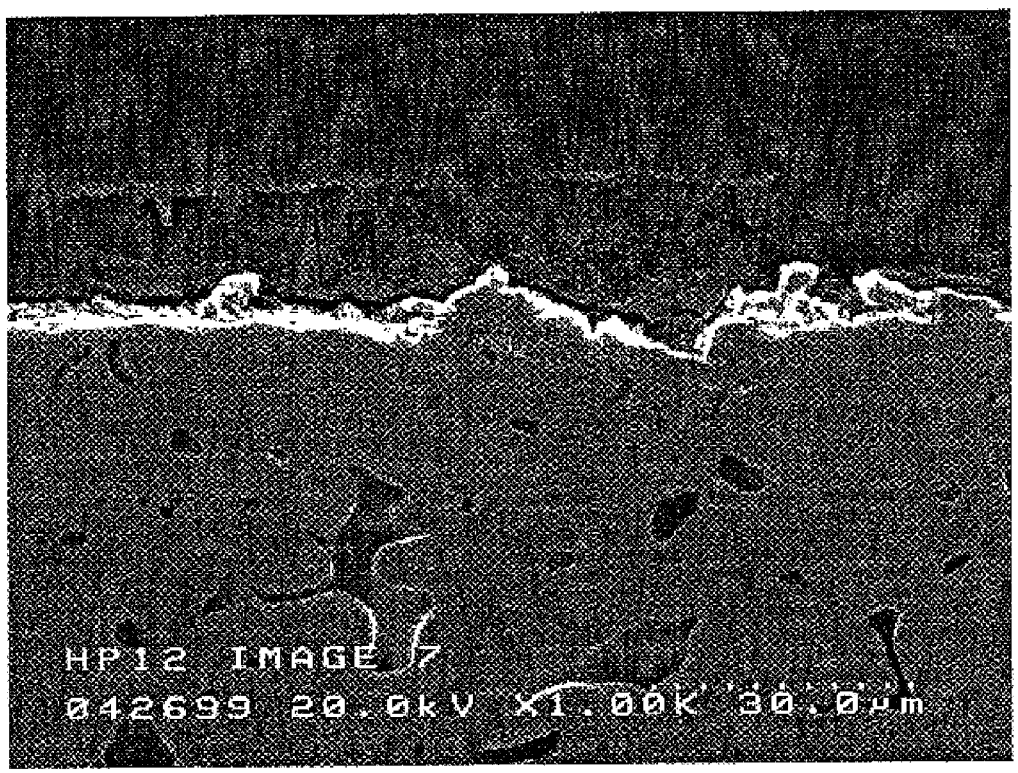

The invention also relates to the use of the novel ultrafiltration membrane to separate macromolecules from solution. An example is shown separating bovine serum albumin from water. The membrane functions by separating and by selective adsorption. Because of the membrane's porous metal support, it is well suited to industrial applications.

The unique properties of the supported mesoporous carbon membrane also allow the membrane to be used in transient pressure or temperature swing separations processes. Such processes were not previously possible with existing mesoporous membranes. The present invention, however, possesses the requisite physical properties to perform such novel ultrafiltration processes.

37 Claims, 24 Drawing Sheets

OTHER PUBLICATIONS

Foley (1995), Carbogenic Molecular–Sieves—Synthesis, Properties and Applications, *Microporous Materials*, 4,6, pp. 407–433.

Acharya and Strano (1999), Simulation of Nanoporous Carbons: A Chemically Constrained Structure, *Phil. Mag. B*, 79,10, pp. 1499–1518.

Acharya and Raich (1997), Metal–Supported Carbogenic Molecular Sieve Membranes: Synthesis and Applications, *Industrial & Engineering Chemistry Research*, 36,8, pp. 2924–2930.

Acharya and Foley (1999), Spray–Coating of Nanoporous Carbon Membranes for Air Separation, *Journal of Membrane Science*, 161, pp. 1–5.

Shiflett and Foley (1999), Ultrasonic Deposition of High Selectivity Nanoporous Carbon Membranes, *Science*, 285, 17, pp. 1902–1905.

Lafyatis and Tung (1991), Poly(Furfuryl Alcohol)–Derived Carbon Molecular–Sieves—Dependence of Adsorptive Properties On Carbonization Temperature, Time, and Poly-(Ethylene Glycol) Additives, *Industrial & Engineering Chemistry Research*, 30,5, pp. 865–873.

Mariwala and Foley (1994), Evolution of Ultramicroporous Adsorptive Structure in Poly(Furfuryl Alcohol)–Derived Carbogenic Molecular–Sieves, *Industrial & Engineering Chemistry Research*, 33, 3, pp. 607–615.

Strano and Foley (2000), Deconvolution of Permeance through Supported Nanoporous Membranes, *AIChE Journal*, 46, 3, pp. 651–658.

Carman (1956), Flow of Gases through Porous Media, pp. 50–61.

Mariwala and Foley (1994), Calculation of Micropore Sizes in Carbogenic Materials From the Methyl–Chloride Adsorption–Isotherm, *Industrial & Engineering Chemistry Research*, 33,10, pp. 2314–2321.

Stevens (1999), Cesium/Nanoporous Carbon Composite Materials: Synthesis, Characterization, and Base Catalysis, Ph.D. Thesis, University of Delaware, Chap. 2, pp. 46–92.

Nobrega, Balmann (1989), Transfer of dextran through ultrafiltration membranes: a study of rejection data analyzed by gel permeation chromatography, *Journal of Membrane Science*, 45, pp. 17–36.

Granath (1958), Solution properties of branched dextrans. *J. Colloid Interface Sci.*, 13, pp. 308–328.

Clark and Bansal (1991), Protein Adsorption and Fouling in Ceramic Ultrafiltration Membranes, *Journal of Membrane Science*, 55, pp. 21–38.

Ho and Zydney (1999), Effect of Membrane Morphology on the Initial Rate of Protein Fouling During Microfiltration, *Journal of Membrane Science*, 155, pp. 261–275.

Dejmek and Nilsson (1989), Flux–Based Measures of Adsorption to Ultrafiltration Membranes, *Journal of Membrane Science*, 40, pp. 189–197.

van den Berg and Smolders (1989), The Boundary–Layer Resistance Model for Unstirred Ultrafiltration. A New Approach, *Journal of Membrane Science* 40, pp. 149–172.

Rao and Sircar (1996), Performance and pore characterization of nanoporous carbon membranes for gas separation, *Journal of Membrane Science*, 110, pp. 109–118.

Feng, Pan and Ivory (2000) Pressure Swing Permeation: Novel Process for Gas Separation by Membranes, *AIChE Journal*, vol. 6, No. 4, pp. 724–733.

Rao and Sircar (1993) Nanoporous carbon membranes for separation of gas mixtures by selection surface flow, *Journal of Membrance Science* 85, pp. 253–264.

* cited by examiner

SUPPORTED MESOPOROUS CARBON ULTRAFILTRATION MEMBRANE AND PROCESS FOR MAKING THE SAME

STATEMENT OF GOVERNMENT INTEREST

This invention was made with the financial support of the United States Government to Contract No. DE-FG02-97ER14802 awarded by the Department of Energy. The United States Government may have certain rights in this invention.

FIELD OF THE INVENTION

This invention relates to the field of filtration membranes, generally, and specifically to the field of mesoporous membranes, particularly ultrafiltration and diafiltration membranes. The invention also relates to the novel process of using supported porous carbon membranes for selective adsorption and separation.

BACKGROUND OF THE INVENTION

Membrane filtration technologies are critical to a variety of industrial process applications including cell harvesting, sterilization of biological solutions, clarification of antibiotics, concentration of protein solutions, and particulate filtration. Ultrafiltration is a particular type of membrane separation process that is used to separate macromolecules such as proteins from solutions containing solvents and low molecular weight solutes under the presence of a pressure gradient. Ultrafiltration membranes typically have a pore size from 1 nm to 100 nm. Diafiltration is similar to ultrafiltration, except that changes are made to the solution during processing; in diafiltration the dilution level is typically manipulated during filtration. Membranes used for either of these purposes have the ability to fractionate macromolecular components based upon their individual molecular masses. The typical membrane molecular weight cut-off range is from about $10^3$ to $10^7$ g/mol.

Ultrafiltration is typically carried out with the solution to be processed (rententate) on one side of the membrane and the purified stream (permeate) exiting the system on the other side. The rejected-stream side is operated under higher pressure than the permeate side creating a pressure gradient that drives the solution through the porous membrane structure. The desired component or components remain behind, blocked or retained by their inability to permeate the membrane.

During operation, membrane throughput—the rate at which solution passes through the membrane—typically diminishes as the membrane surface becomes fouled with the retained component. Accordingly, the membrane must be periodically cleaned to remove fouling agents, i.e., aggregated proteins, bacterial contamination, etc. This is most commonly performed by exposing the membrane surface to a chemical reagent and back-flushing the system.

Traditionally, ultrafiltration membranes have been primarily polymeric in nature. See Zydney and Zeman (1996), *Microfiltration and Ultrafiltration—Principles and Applications*, Marcel Dekker, New York, N.Y. Asymmetric ultrafiltration membranes are commonly synthesized using phase inversion, where a polymer solution of a base and poreformer in a solvent is induced to form two interdispersed liquid phases. After coagulation, a solid membrane gel is produced. Membranes synthesized in this manner include the bilayer type which contains slit-shaped fissures or cracks, see Michaels, U.S. Pat. No. 3,615,024 (1971), and those membranes that contain plasticizers and are stable while dry, see Tweddle and Thayer, U.S. Pat. No. 4,451,424 (1984). See also Cabasso and Levy, U.S. Pat. No. 4,954,381 (1990).

Despite the widespread use of these types of polymeric ultrafiltration membranes, they have several well-known disadvantages. First, the low mechanical stability of polymeric ultrafiltration membranes constrains their maximum operating pressure. The low mechanical stability of polymeric ultrafiltration membranes limits their operating capacity, i.e., maximum permeate flux, because permeate flow is proportional to operating pressure under most conditions. Additionally, the low mechanical stability of polymeric ultrafiltration membranes leads to deformation during operation that can adversely affect membrane performance. Second, polymeric ultrafiltration membranes are particularly sensitive to the harsh reagents and solvents used to remove fouling components. After repeated cleaning, polymeric ultrafiltration membranes typically show signs of degradation. Third, most polymeric ultrafiltration membranes must contain either a humectant, such as glycerol or water, or must be maintained in a saturated state at all times which requires that they be transported and stored in a solvent. Membranes that are unstable with respect to drying or leaching of a humectant are not robust and special considerations, which can be expensive, must be taken during their processing and handling. See Degen et al., U.S. Pat. No. 5,480,554 (1996). Last, mass-produced polymeric ultrafiltration membranes are known to possess cracks and other defects that span the separating layer and limit the performance of these membranes. Curiously, the porous structure of some polymeric ultrafiltration membranes is derived solely from cracking during processing. See Michaels, U.S. Pat. No. 3,615,024 and Degen et al., U.S. Pat. No. 5,480,554.

The supported porous carbon ultrafiltration membranes of the present invention offer many advantages over existing ultrafiltration membranes. The present invention relates to a supported porous carbon membrane having pores in the ultrafiltration range. The carbon membrane is synthesized both within and on top of the macroporous support. The support provides the membrane with high mechanical strength and resists deformation even at high driving force pressures. Deformation due to organic solvent influx, i.e., polymeric swelling, is avoided because the membrane is not polymeric and is strengthened by the rigidity of the support. Because the membrane can operate at higher pressures compared to polymeric membranes, filtration processes using membranes of the present invention can be operated at higher throughput rates.

The carbon membranes of the present invention naturally resist chemical attack during cleaning. In addition to the chemical-based cleaning methods known in the art, the membranes can also be cleaned using either steam sterilization or high temperature desorption because the membranes are stable at high temperatures. Notably, the membranes are stable at temperatures above the melting point of polymeric ultrafiltration membranes.

Carbon membranes are also stable when exposed to air and moisture. The carbon membranes do not require the addition of plasticizing agents or to be handled under a solvent which is necessary for many polymeric ultrafiltration membranes. See Foley (1995), *Carbogenic Molecular-Sieves—Synthesis, Properties and Applications*, Microporous Materials, 4, 6, pp. 407–433.

The present invention relates to a supported mesoporous carbon membrane where the mesoporous carbon exists both within and external to a structural support, such as porous stainless steel. Currently, the only known examples of supported carbon membranes are used in gas phase separations. These gas-phase membranes have pore sizes in the range of from 0.3 to 1 nm (nanoporous range). The nanoporous carbon membranes are synthesized by the pyrolysis of certain organic and natural polymers. Upon unimolecular reaction at high temperatures, the carbonizing polymers decompose, leaving a nanoporous graphite-like carbon solid. See Foley (1995) at 407–433. The porosity of the polymer precursors is not preserved in the final product. Rather, the porosity results from the carbon membrane's metastable, graphite-like structure having atomic-size pores. See Acharya and Strano (1999), *Simulation of Nanoporous Carbons: A Chemically Constrained Structure*, Phil. Mag. B, 79, 10, pp. 1499–1518. Acharya and coworkers have used stainless steel supports to prepare nanoporous gas separation membranes from poly(furfuryl alcohol) resin. See Acharya and Raich (1997), *Metal-Supported Carbogenic Molecular Sieve Membranes: Synthesis and Applications*, Industrial & Engineering Chemistry Research, 36, 8, pp. 2924–2930; Acharya and Foley (1999), *Spray-Coating of Nanoporous Carbon Membranes for Air Separation*, Journal of Membrane Science, 161, pp. 1–5. These particular membranes have a remarkable ability to affect small molecule separations such as oxygen and nitrogen extraction from air. See Shiflett and Foley (1999), *Ultrasonic Deposition of High Selectivity Nanoporous Carbon Membranes*, Science, 285, 17, pp. 1902–1905. However, these types of membranes cannot be used for ultrafiltration purposes because the pores are too narrow (generally less than 1 nm). The small scale of these pores requires transport of liquid feeds across the membrane to proceed by vaporization and adsorption at one boundary of the membrane, then migration of the adsorbed phase across the interior of the membrane, then evaporation at the other surface. Because of this adsorbed phase transport, the nanoporous membranes cannot transport and preserve liquid-phase components across the membrane. Thus, the present invention also relates to the novel application of a supported mesoporous carbon membranes to macromolecular separation.

For efficient ultrafiltration of macromolecular species, it is necessary to control the mode of the pore size distribution of the carbon membrane to range between 1 to 10 nm. All nanoporous adsorbents—especially those based on carbon—have pores sizes in the range of 0.3 to 1.0 nm and cannot be used for this purpose. It has also never been experimentally verified that carbonizing a polymer-based ultrafiltration membrane can produce a carbon membrane having a pore structure in the ultrafiltration range. In fact, this synthesis route is highly unlikely to be successful because polymeric ultrafiltration membranes typically cannot exist without a plasticizer or humectant, both of which are intrinsically unstable at carbonization temperatures. Additionally, polymeric ultrafiltration membranes require external protection against drying of any kind which cannot be maintained during carbonization.

The present invention further relates to a membrane fabrication process that directs the pyrolysis of a noncarbonizing templating polymer precursor to form an additional pore-size distribution in the mesoporous or ultrafiltration range. The mesoporous carbon membrane is synthesized on a macroporous stainless steel support that provides the resulting membrane with superior mechanical strength compared to existing ultrafiltration membranes. The membranes synthesized according to the present invention were characterized using generally accepted, phenomenology-based techniques. The utility of the mesoporous supported carbon membranes of the present invention was demonstrated with model macromolecular separations.

The process of preparing the novel membranes involves coating a porous metal membrane support with a polymeric precursor composition comprising both a carbonizing polymer and a noncarbonizing templating polymer. The noncarbonizing templating polymer directs the formation of pores in the ultrafiltration range. The coated support is then pyrolyzed in an inert-gas atmosphere. Lafyatis and coworkers found that the addition of certain noncarbonizing polymers such as poly(ethylene glycol) to carbonizing nanoporous-carbon precursors has a pronounced effect on the meso- and macropore structure of carbonaceous adsorbents synthesized through polymer pyrolysis. See Lafyatis and Tung (1991), *Poly(Furfuryl Alcohol)-Derived Carbon Molecular-Sieves—Dependence of Adsorptive Properties On Carbonization Temperature, Time, and Poly(Ethylene Glycol) Additives*, Industrial & Engineering Chemistry Research, 30, 5, pp. 865–873. In addition to having a pore size distribution mode in the nanopore region (below 1 nm), these materials have a second mode centered in the meso- (1 to 100 nm) to macropore (100 to 1000 nm) regions. Experimentation suggests that the location of this second mode depends directly upon the average molecular weight of the noncarbonizing templating polymer used, for example poly (ethylene glycol), as well as the synthesis conditions. Therefore, the inventors have unexpectedly found that by manipulating the characteristics of these additives, one can synthesize a porous carbon membrane with carefully controlled pore sizes in the ultrafiltration range.

SUMMARY OF THE INVENTION

An object of the present invention is to provide a supported mesoporous carbon membrane. Another object of the present invention is the method of producing a supported mesoporous carbon membrane. A further object of the present invention is using a supported mesoporous carbon membrane for the selective adsorption or separation of proteins or other macromolecules in solution.

In accordance with these objectives, the supported mesoporous carbon membranes of the present invention have a controlled pore-size distribution in the mesoporous range making them capable of retaining macromolecules in aqueous solutions. The mesoporosity of the membranes according to the present invention is produced in the carbon layer by the addition of a noncarbonizing templating polymer, such as poly(ethylene glycol) ("PEG"), to a nanoporous carbon precursor, i.e., a carbonizing polymer precursor such as poly(furfuryl alcohol) ("PFA"), and pyrolyzing the polymeric precursors on a porous support. The pyrolysis of the polymeric precursor mixture on the support produces a templated nanoporous carbon membrane.

The supported mesoporous carbon membranes of the present invention have a composite structure. The membranes of the present invention comprise a mesoporous carbon layer that is located within and/or on top of a porous-metal macroporous support. These membranes have the mechanical strength properties of the porous-metal support and the macromolecular sieving properties of the porous-carbon material. These characteristics are not available in either material separately.

The supported mesoporous carbon membranes of the present invention utilize a porous stainless steel support. In a preferred embodiment, the stainless steel macroporous support has a pore size of from about 0.1 to 100 $\mu$m. In a most-preferred embodiment, the stainless steel macroporous support has a pore size of about 0.2 μm.

In a preferred embodiment of the present invention, the supported mesoporous carbon membranes are prepared from a polymeric precursor mixture comprising poly(ethylene glycol) as the noncarbonizing template polymer precursor and poly(furfuryl alcohol) as the carbonizing polymer precursor. In a preferred embodiment, the weight ratio of PEG to PFA is from 1:3 to 3:1. In a more preferred embodiment, the weight ratio of PEG to PFA is 1:1. In yet another embodiment, the molecular weight of the PEG is from 1000 to 18500 amu. In a more preferred embodiment, the molecular weight of the PEG is from 2000 to 8000 amu. In a still more preferred embodiment of the invention, the molecular weight of the PEG is from 3400 to 8000. In a most preferred embodiment, the molecular weight of the PEG is about 8000 amu.

The supported mesoporous carbon membranes of the instant invention have the capacity to permeate liquid solvents under pressure and to sieve, i.e., to retain, particles in the range from 1 to 100 nm. Thus, it is an object of the present invention that the supported mesoporous carbon membranes have an effective or operating pore size of from about 1 to 100 nm. The effective pore size of the mesoporous carbon material is preferably from 1 to 50 nm. The effective pore size of the mesoporous carbon material is most preferable from 1 to 10 nm.

There are numerous industrial applications for the membranes produced according to the present invention. Because the membranes contain a porous-metal support, the membrane support can be prefabricated to very small tolerances and does not require the use of custom-made fittings. Thus, the membrane can be easily and economically incorporated into industrial processes. The porous metal support also permits the membrane to be easily sealed to isolate the two sides of the membrane using commonly-known gaskets or similar devices.

In the field of membrane separation, the attachment of the membrane to the process tubing is crucial to successful operation of the membrane. Because the membrane of the present invention incorporates a porous-metal support, the attachment of the membrane does not require special expertise beyond that which one trained in the art of connecting pieces of metal would be required to have. In a preferred embodiment of the present invention, the membrane is welded to the process tubing. Another preferred embodiment is to connect the membrane to the process tubing using standard compression or vacuum fittings.

In an additional preferred embodiment of the present invention, the support is tube-shaped allowing the membrane to be incorporated into a shell to form a tube-in-shell device. The tube-in-shell device has two zones for fluid flow that are separated by the membrane. To prepare a tube-in-shell device, the membrane is attached, e.g., by welding, at both ends to two lengths of non-porous tubes. To complete the tube-in-shell module, the shell is easily attached to the inner tube using standard compression or vacuum fittings. The membrane module can be used individually, or with several identical units, to provide low energy molecular sieving separations for industry. The module can be assembled and disassembled very quickly, facilitating inspection and replacement of the membrane in industrial applications.

It is a further object of the present invention to provide a separation process using the novel supported mesoporous carbon membrane to separate aqueous protein solutions.

The novel supported mesoporous carbon ultrafiltration membrane of the present invention is further characterized by the following criteria. First, the membrane has a very high mechanical integrity and can be operated at pressures in excess of 1000 psig. Second, the bursting pressure, as rigorously defined, is infinite, i.e., the membrane cannot rupture or deform in the classical sense because the integrity of the membrane is derived from the porous stainless steel support. Third, the membrane is resistant to both mechanical deformation due to higher pressure driving forces and chemical swelling due to organic vapor exposure. Fourth, the membranes are essentially defect-free; the membranes demonstrate total retention of model macromolecular components—there is no partial retention observed during the target separation. Fifth, the membranes can be stored either wet or dry and maintain their separation performance in either condition. Sixth, the carbon surface of the membranes is resistant to chemical attack such as that which occurs during cleaning of conventional filtration membranes. Seventh, the membrane is thermally stable at high temperatures, e.g., greater than 200° C. enabling the use of high-temperature cleaning and separation processes not possible with polymeric membranes. Notably, the separation properties of the carbon layer have been shown to be temperature independent at temperatures lower than the synthesis temperature. See Mariwala and Foley (1994), *Evolution of Ultramicroporous Adsorptive Structure in Poly (Furfuryl Alcohol)-Derived Carbogenic Molecular-Sieves*, Industrial & Engineering Chemistry Research, 33, 3, pp. 607–615. Eighth, the membranes are intrinsically sterile after synthesis. Ninth, the membrane contains a nanopore-size pore distribution, as well as an ultrafiltration-size pore distribution. The nanopores function as an adsorbent layer to remove, albeit not continuously, any smaller impurity that can be readily adsorbed on the nanoporous carbon. Last, the membrane can be used in novel separation processes.

LIST OF FIGURES

FIG. 1. Scanning electron micrograph of a mesoporous carbon membrane (II.6 [M800-7-0.074]) cross section showing external carbon layer and stainless steel support.

Figure 2:
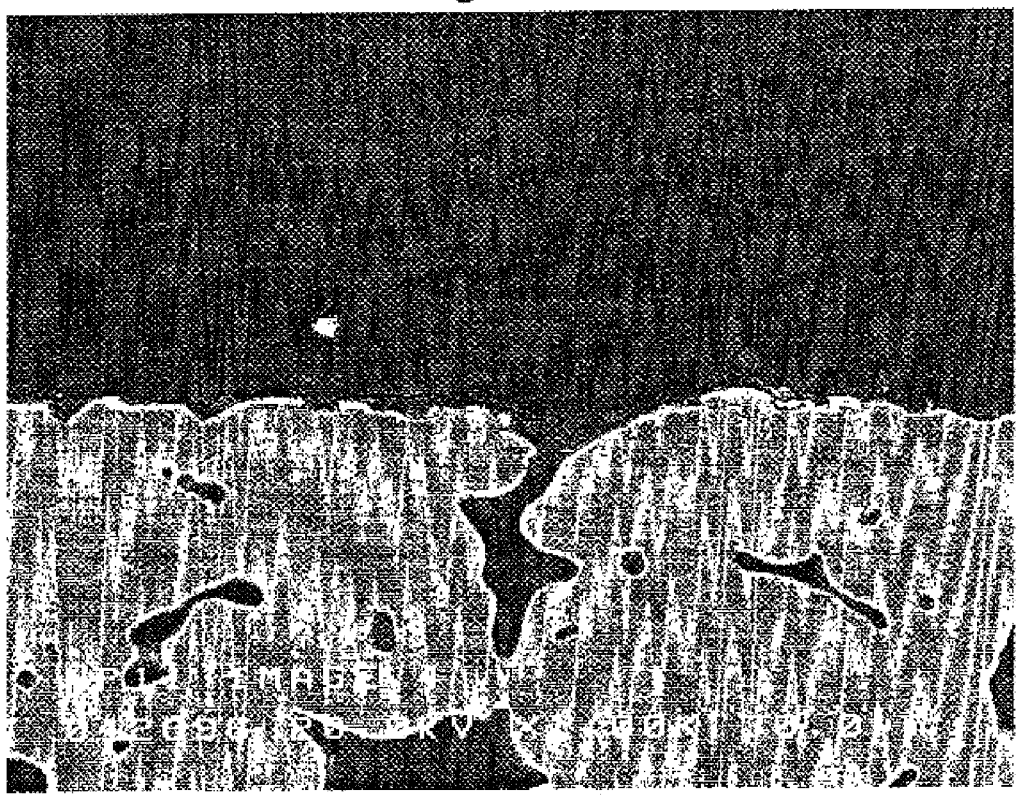

FIG. 2. Scanning election micrograph of the micron scale surface features present in the carbon layer (II.6 [M800-7-0.074]).

Figure 3:

FIG. 3. Scanning election micrograph of the pore structure of the mesoporous carbon membrane (II.6 [M800-7-0.074]).

Figure 4:
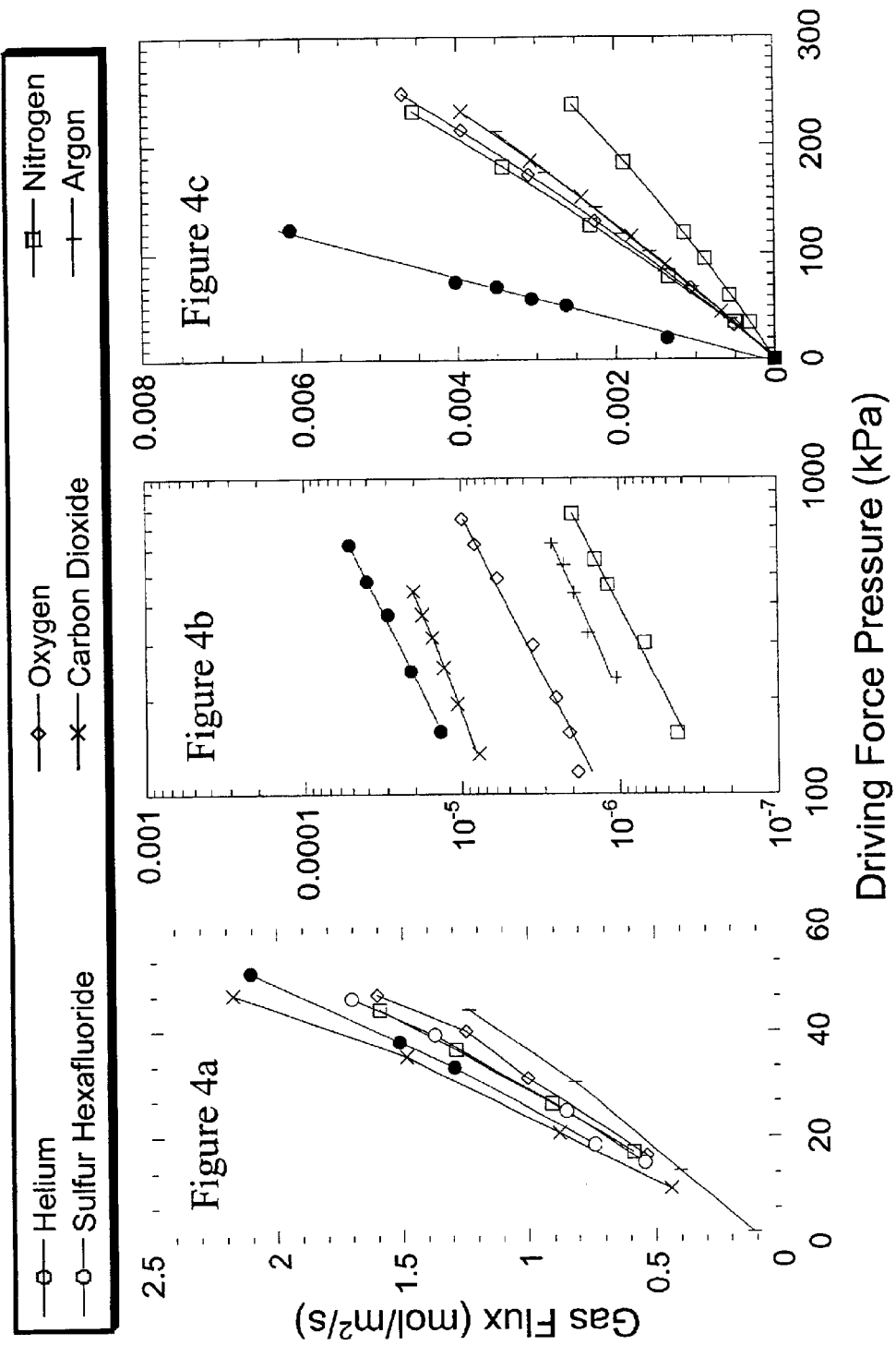

FIG. 4. Flux as a function of driving force pressure for (a) uncoated stainless steel support, (b) 0% PEG/PFA carbon membrane carbonized at 600° C. and (c) 50% 8000 amu PEG/PFA templated membrane (I.1 [M8000-1-0.021]).

Figure 5:
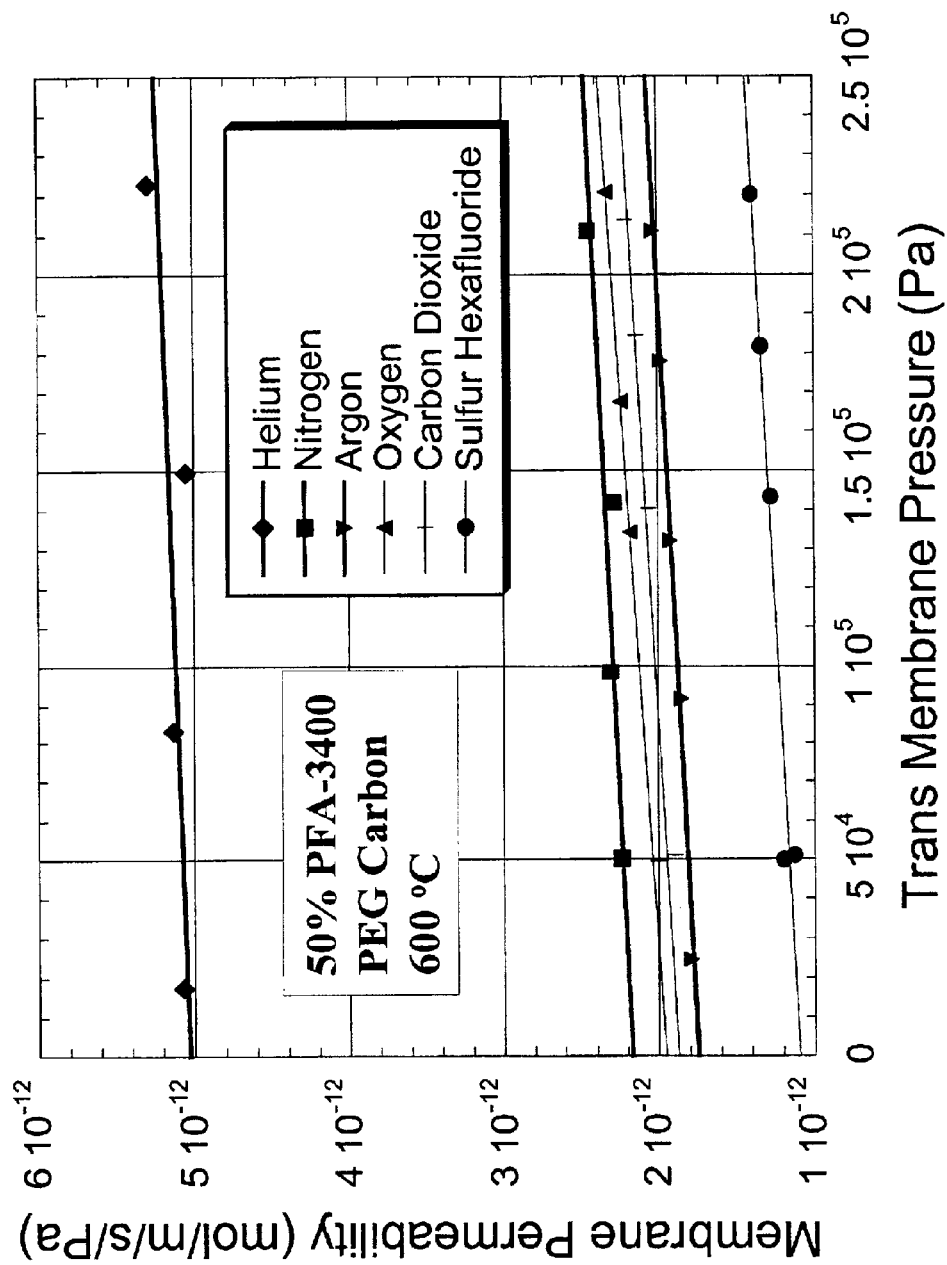

FIG. 5. Gas permeability as a function of trans-membrane pressure for mean pore size characterization for mesoporous carbon membrane (I.5 [M3400-1-1.019]).

Figure 6:
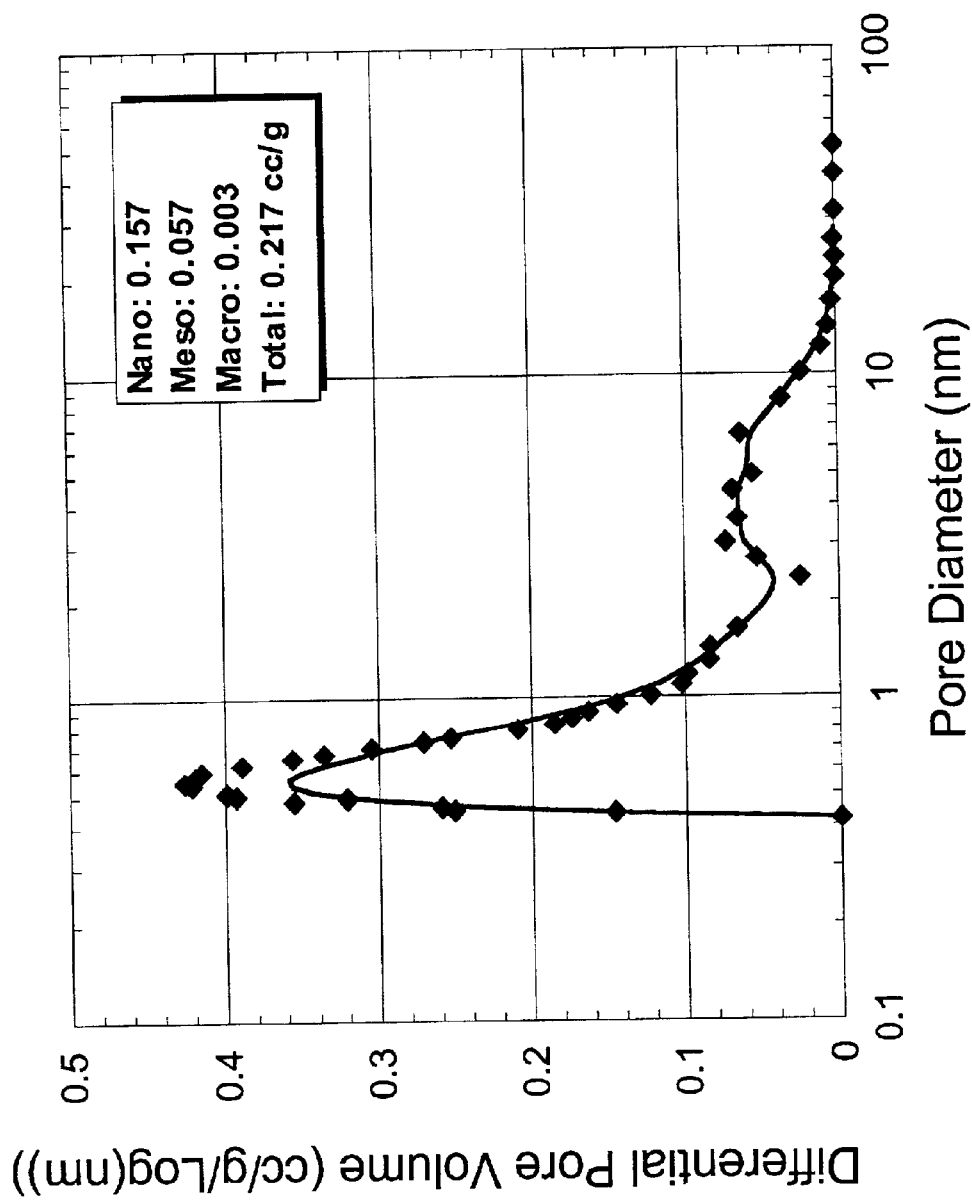

FIG. 6. Pore size distribution of an 850° C. 3:1 PFA:8000 amu PEG porous carbon obtained from methyl chloride adsorption.

Figure 7:
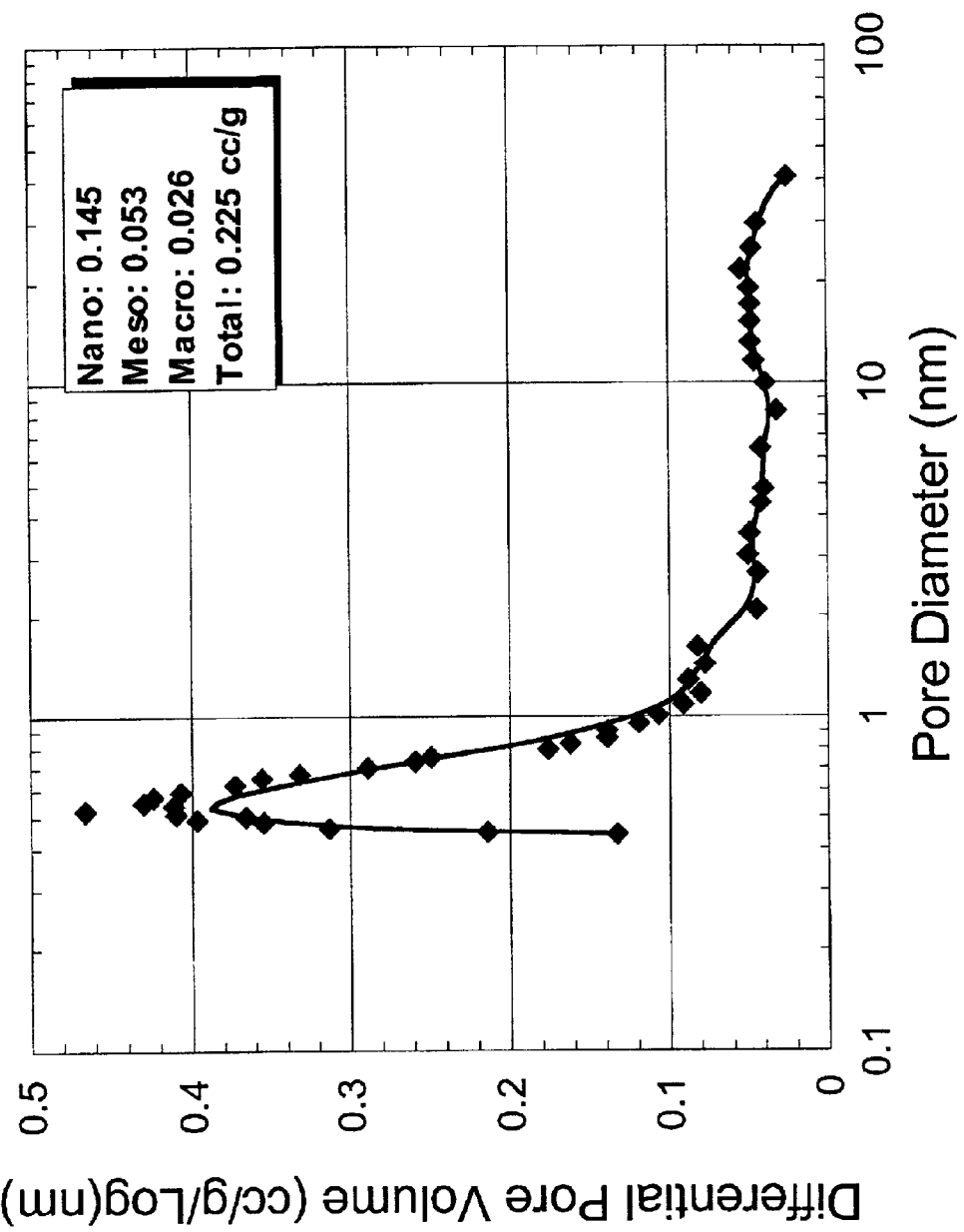

FIG. 7. Pore size distribution of an 850° C. 3:1 PFA:3400 amu PEG porous carbon obtained from methyl chloride adsorption.

Figure 8:
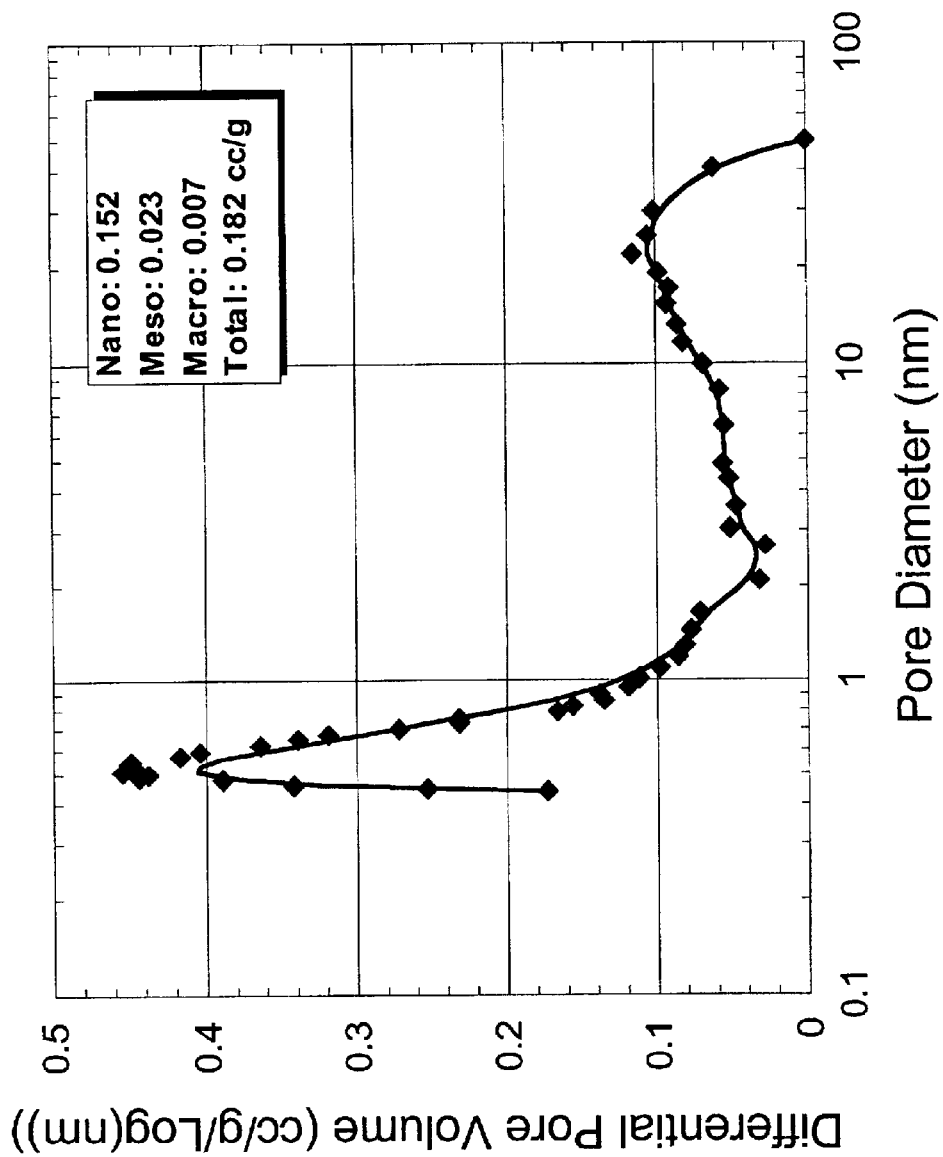

FIG. 8. Pore size distribution of an 850° C. 3:1 PFA:1500 amu PEG porous carbon obtained from methyl chloride adsorption.

Figure 9:
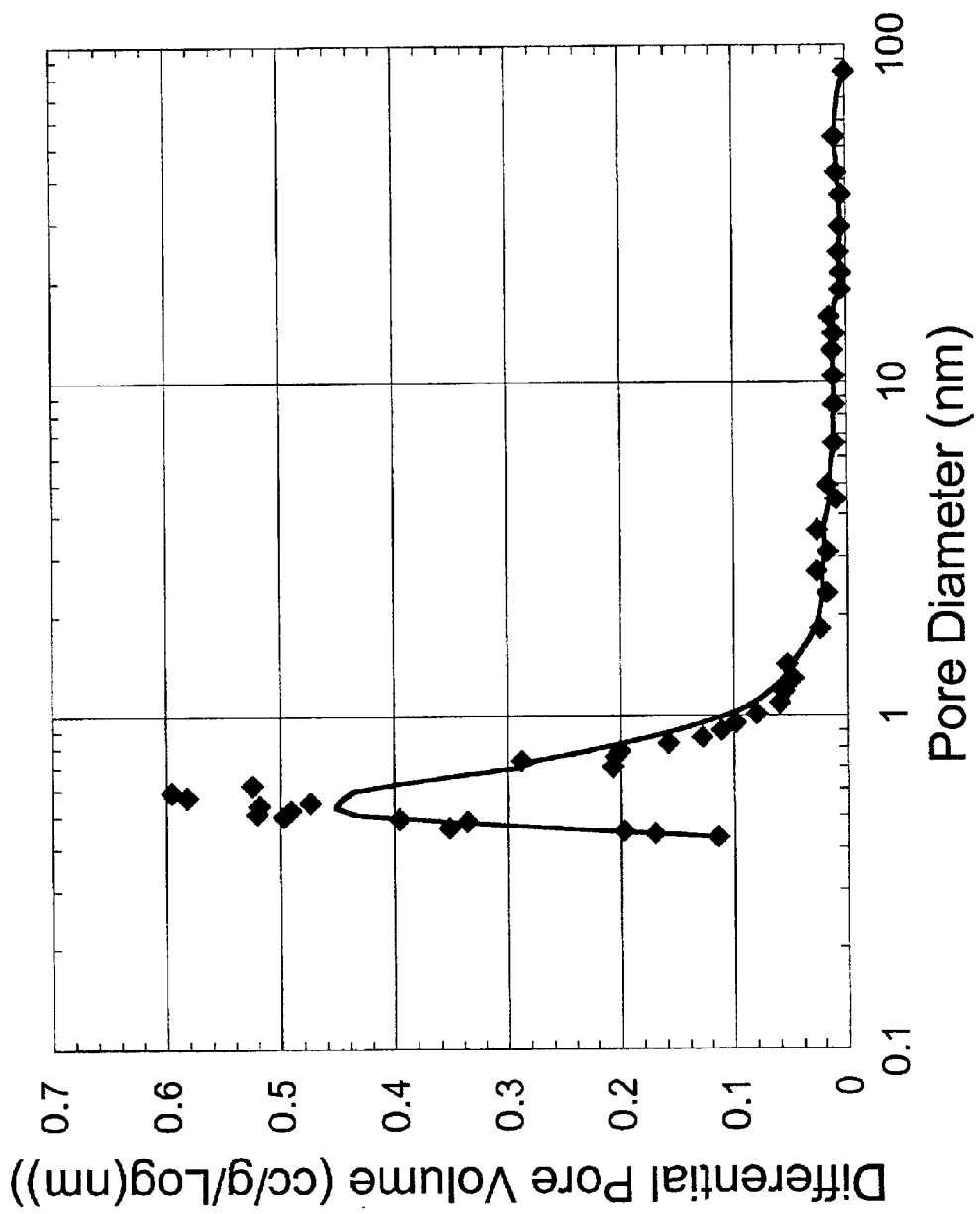

FIG. 9. Pore size distribution of an 850° C. PFA (no PEG) carbonized porous membrane material obtained from methyl chloride adsorption for comparison.

Figure 10:
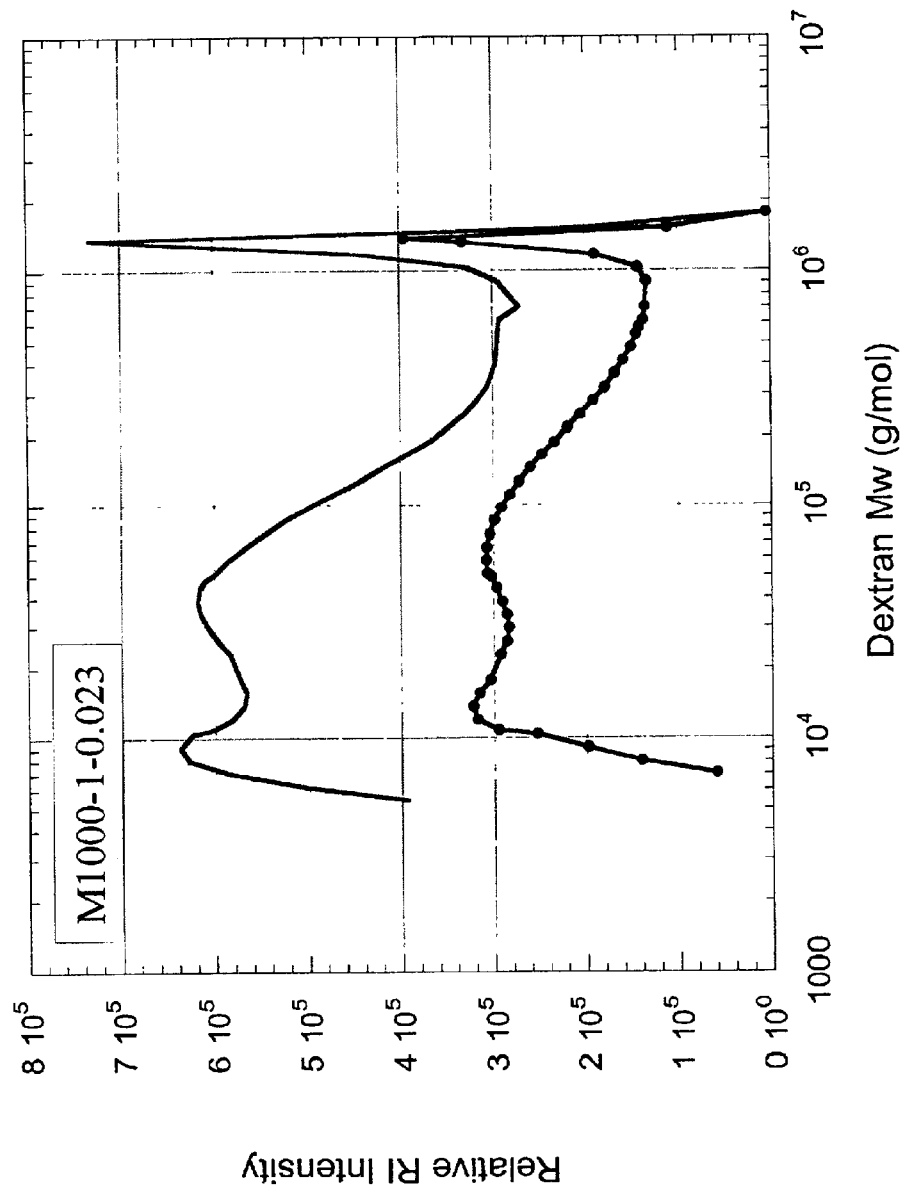

FIG. 10. Permeate (dotted line) and retentate (solid line) SEC analysis of dextran distribution after ultrafiltration through I.15 M1000-1-0.023.

Figure 11:
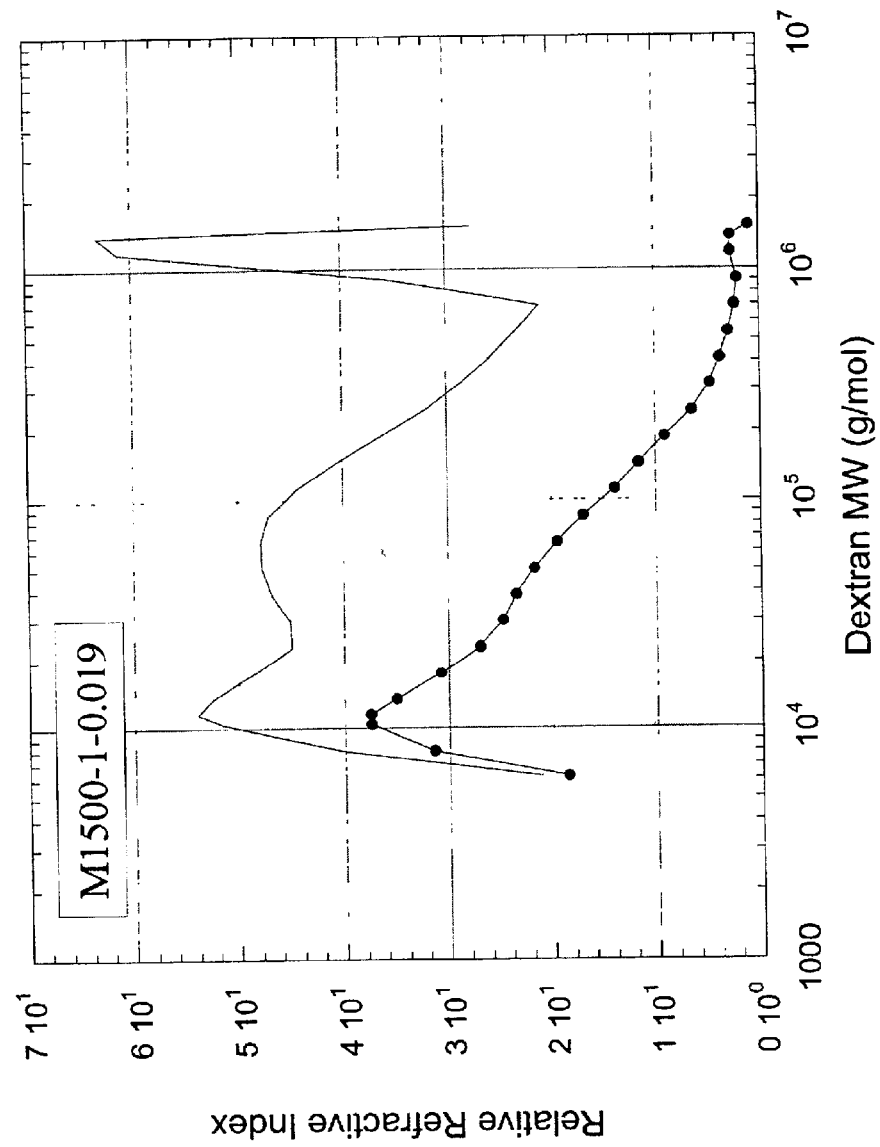

FIG. 11. Permeate (dotted line) and retentate (solid line) SEC analysis of dextran distribution after ultrafiltration through I.4 M1500-1-0.019.

Figure 12:
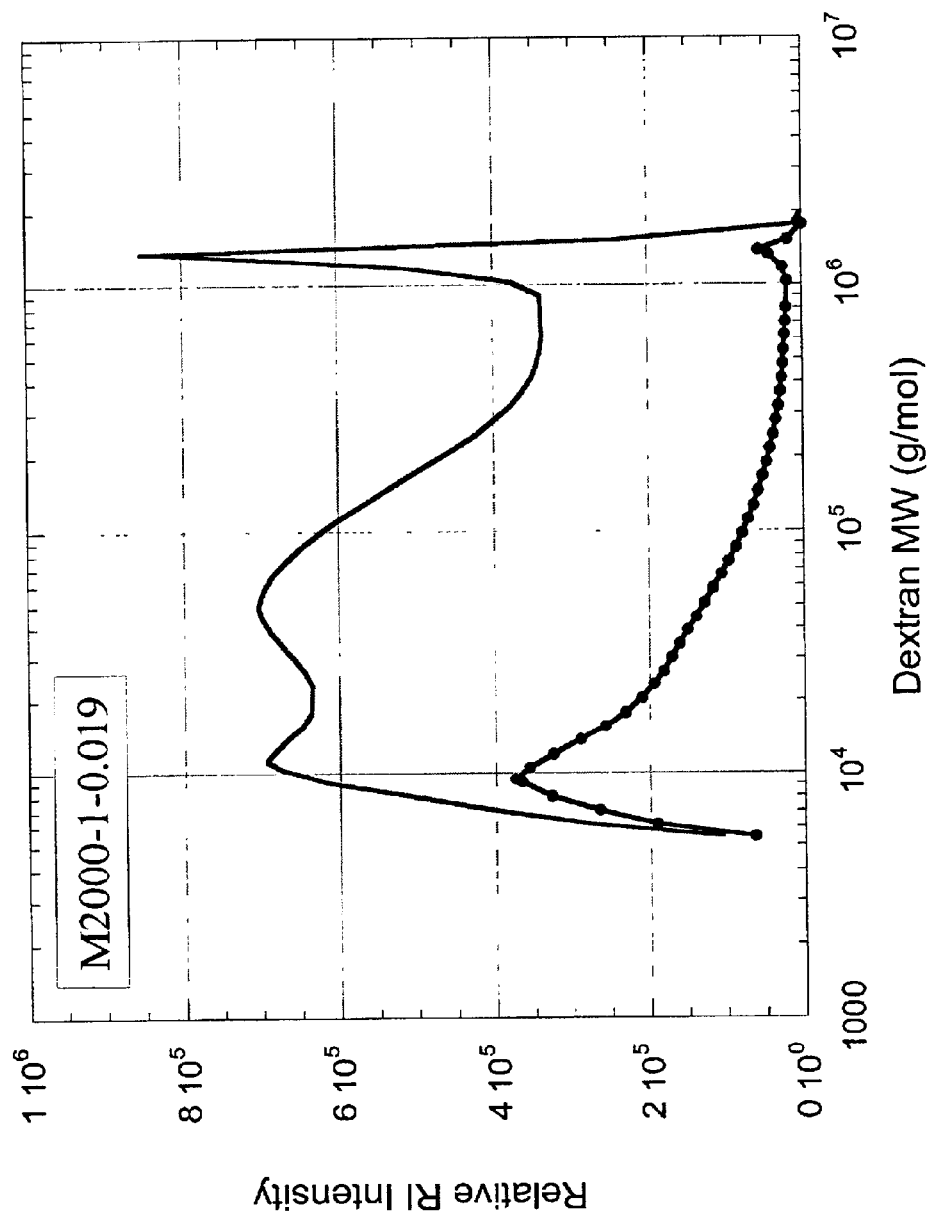

FIG. 12. Permeate (dotted line) and retentate (solid line) SEC analysis of dextran distribution after ultrafiltration through I.10 M2000-1-0.019.

Figure 13:
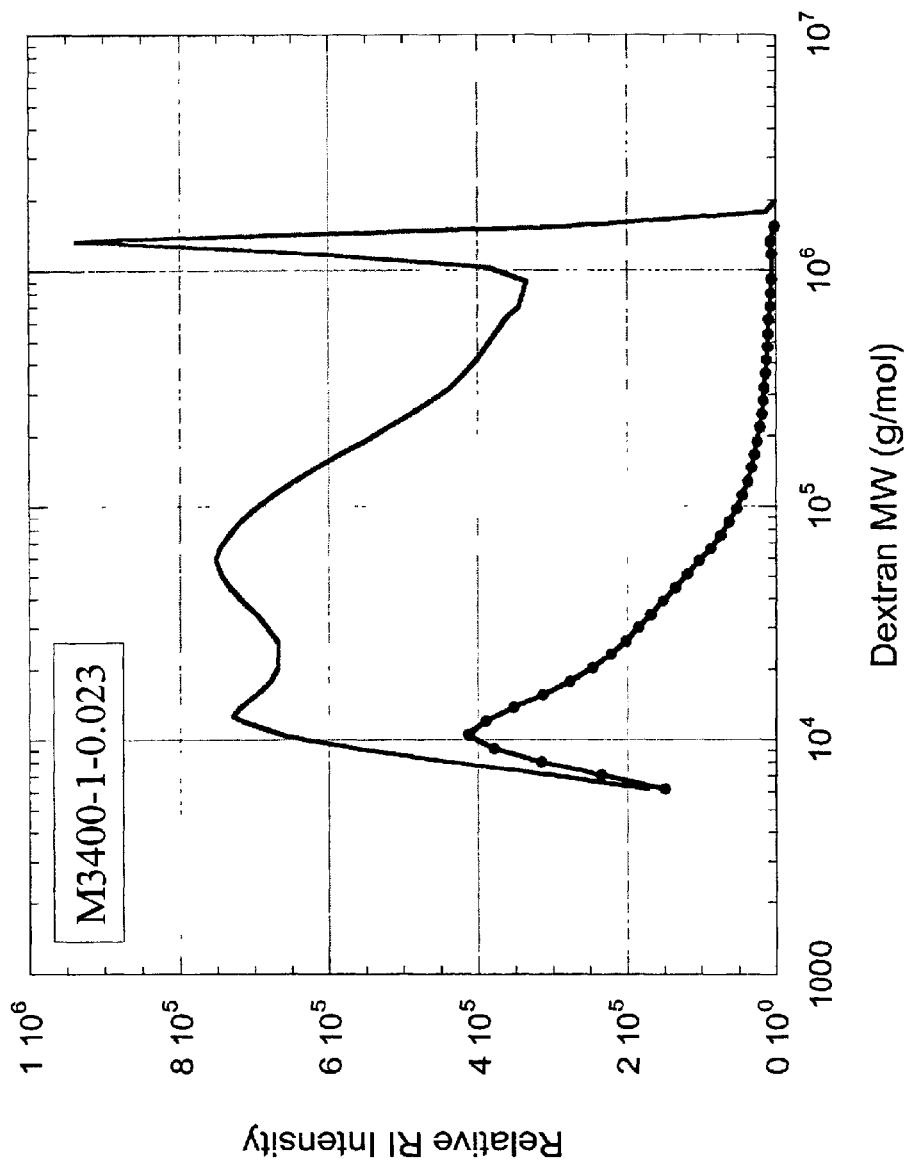

FIG. 13. Permeate (dotted line) and retentate (solid line) SEC analysis of dextran distribution after ultrafiltration through I.8 M3400-1-0.019.

Figure 14:
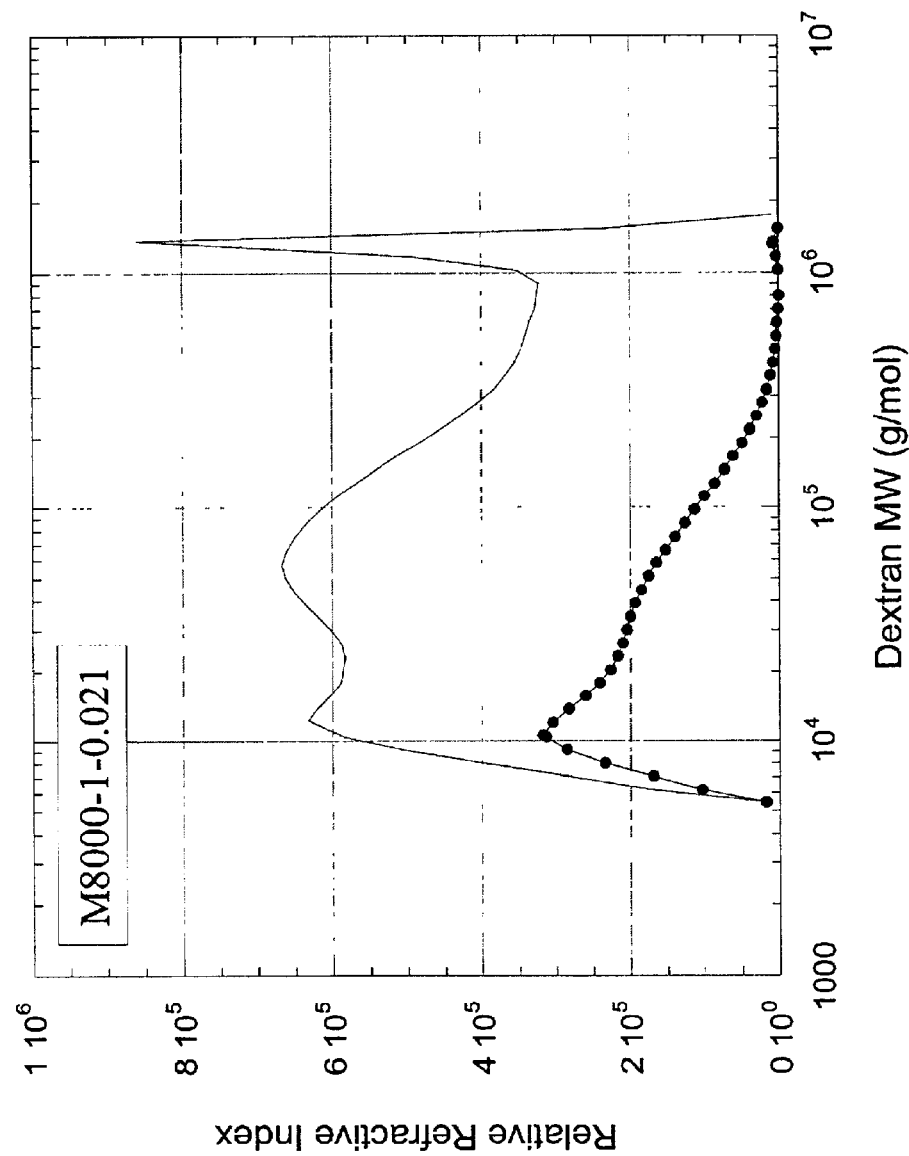

FIG. 14. Permeate (dotted line) and retentate (solid line) SEC analysis of dextran distribution after ultrafiltration through I.1 M8000-1-0.021.

Figure 15:
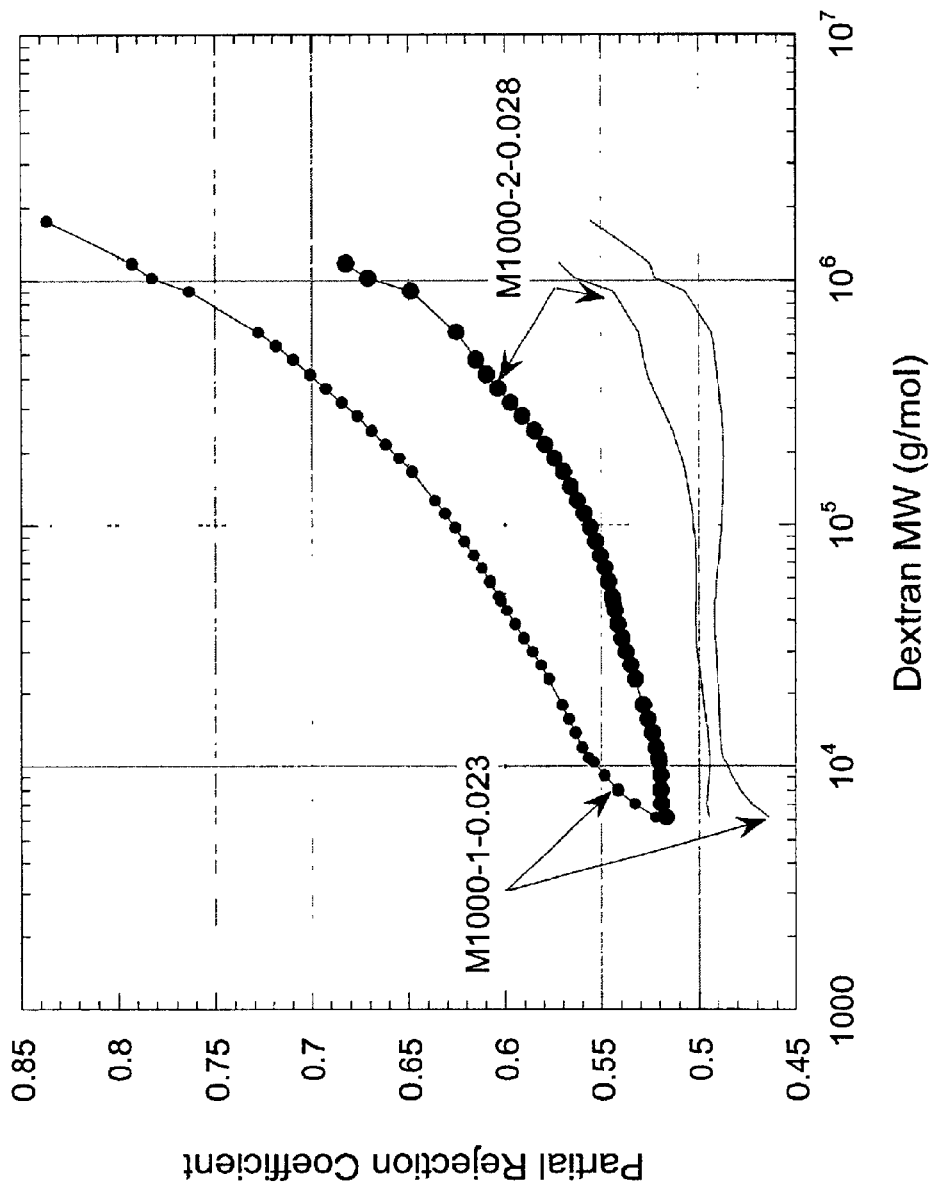

FIG. 15. Observed (dotted line) and actual (solid line) partial rejection coefficients versus dextran molecular weight for carbon membranes synthesized from poly(ethylene glycol) template 1000 MW PEG.

Figure 16:
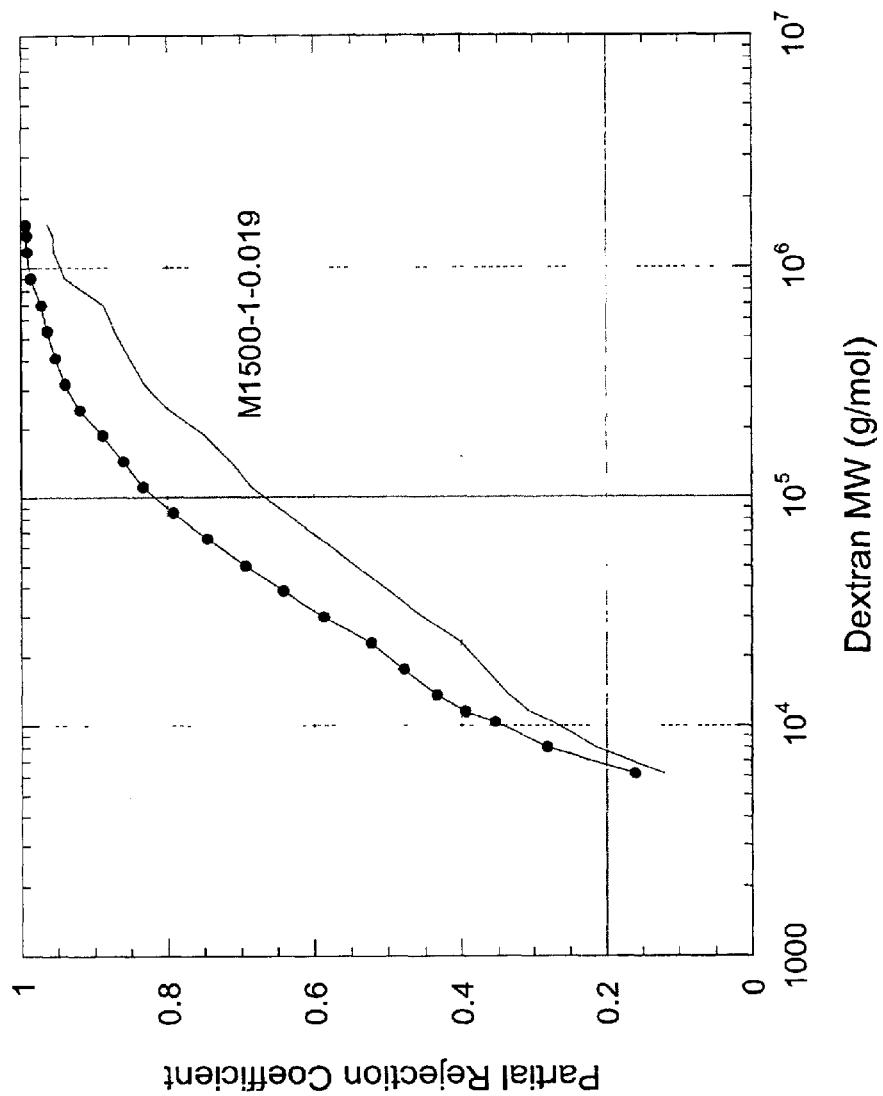

FIG. 16. Observed (dotted line) and actual (solid line) partial rejection coefficients versus dextran molecular weight for carbon membranes synthesized from poly(ethylene glycol) template 1500 MW PEG.

Figure 17:
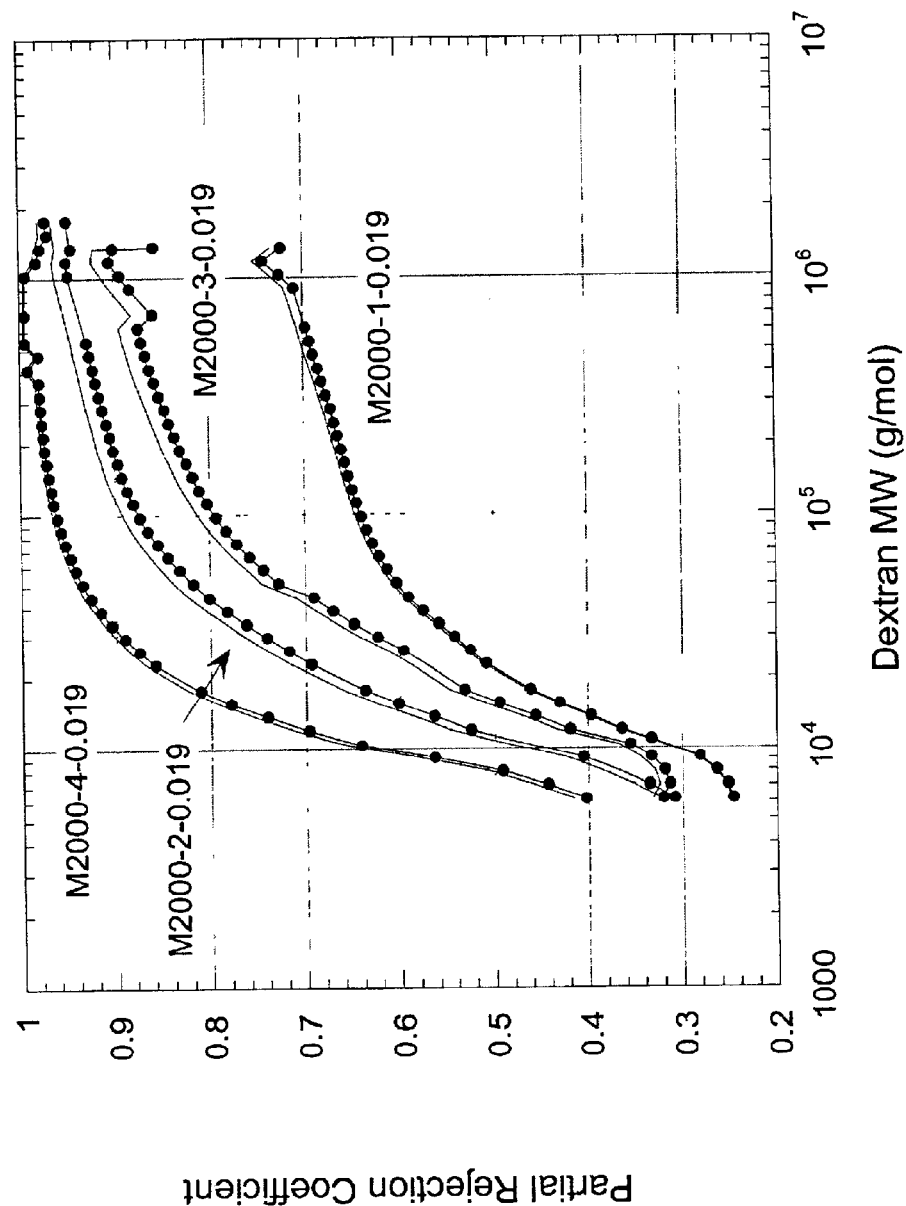

FIG. 17. Observed (dotted line) and actual (solid line) partial rejection coefficients versus dextran molecular weight for carbon membranes synthesized from poly(ethylene glycol) template 2000 MW PEG.

Figure 18:
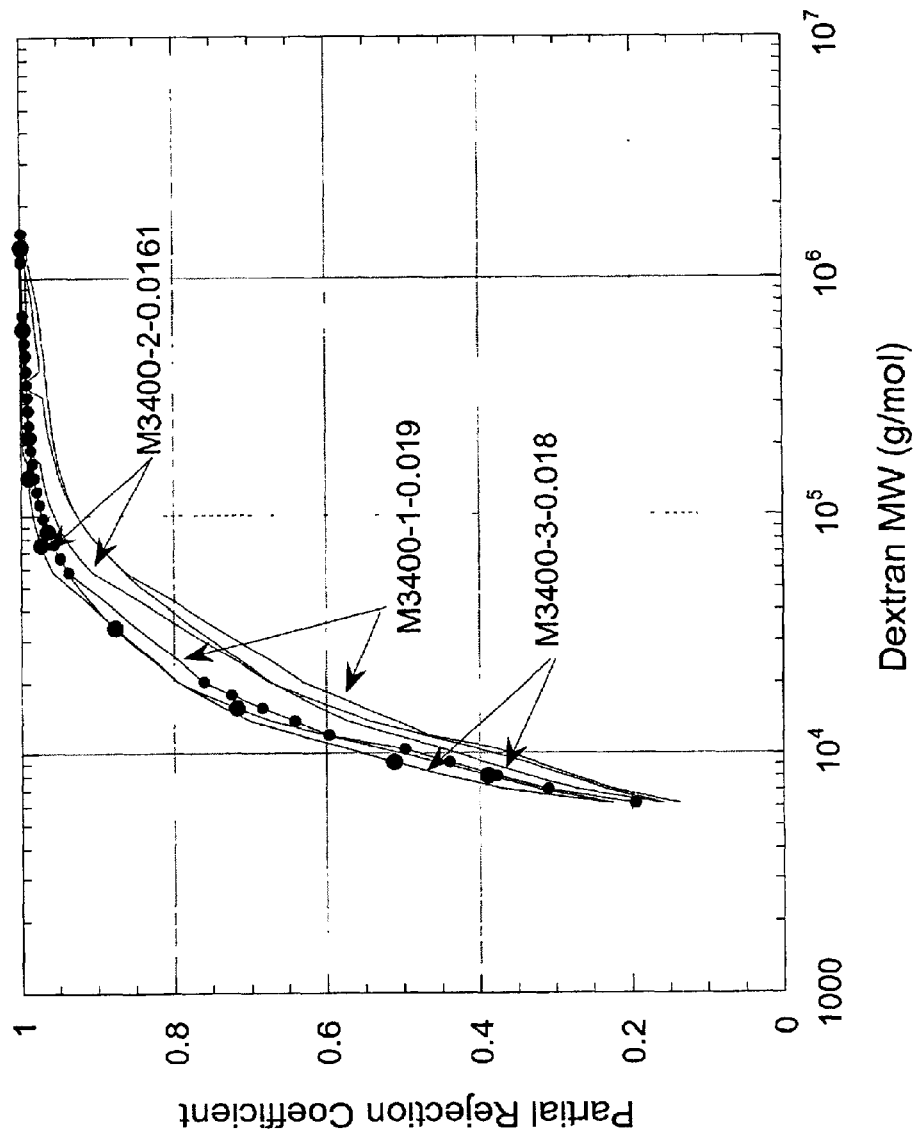

FIG. 18. Observed (dotted line) and actual (solid line) partial rejection coefficients versus dextran molecular weight for carbon membranes synthesized from poly(ethylene glycol) template 3400 MW PEG.

Figure 19:
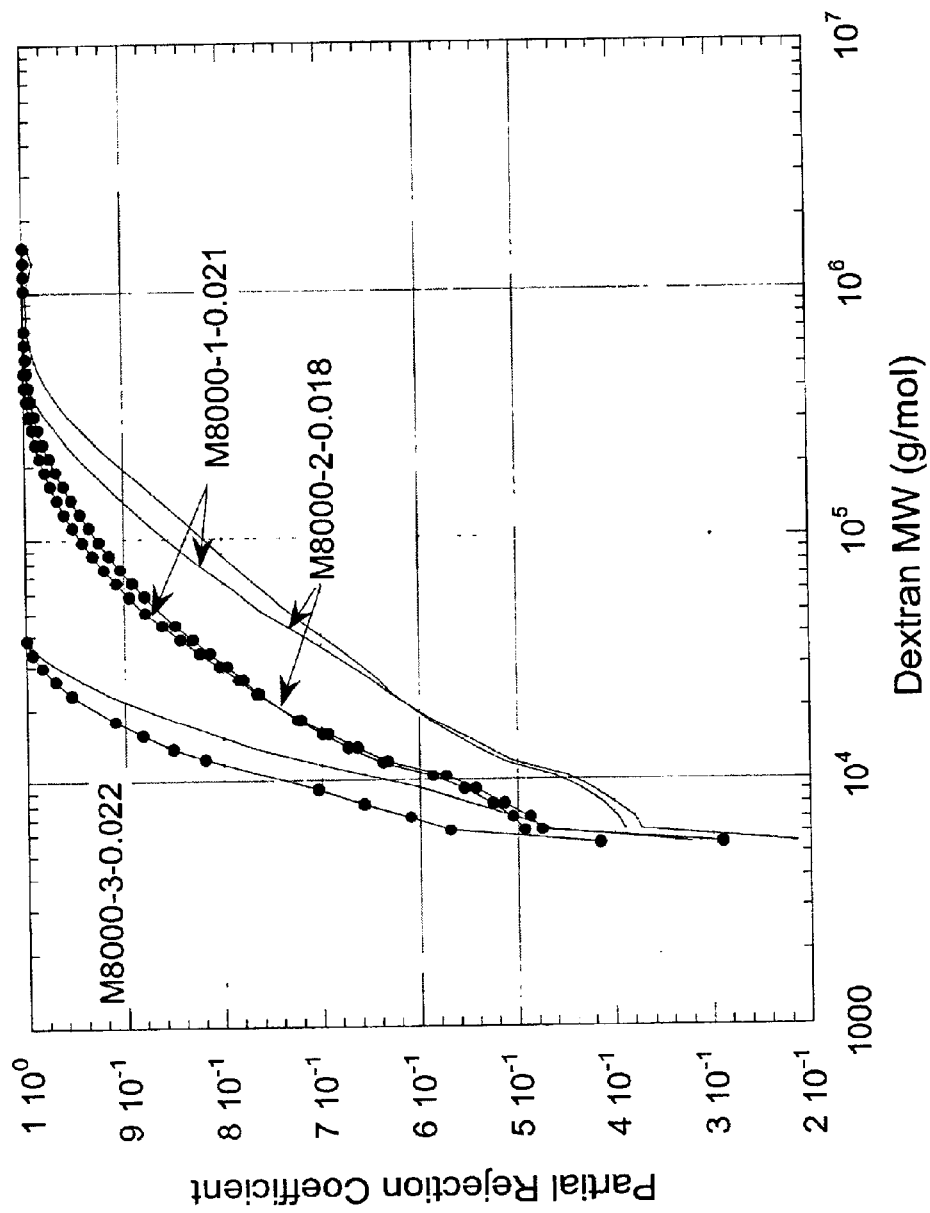

FIG. 19. Observed (dotted line) and actual (solid line) partial rejection coefficients versus dextran molecular weight for carbon membranes synthesized from poly(ethylene glycol) template 8000 MW PEG.

Figure 20:
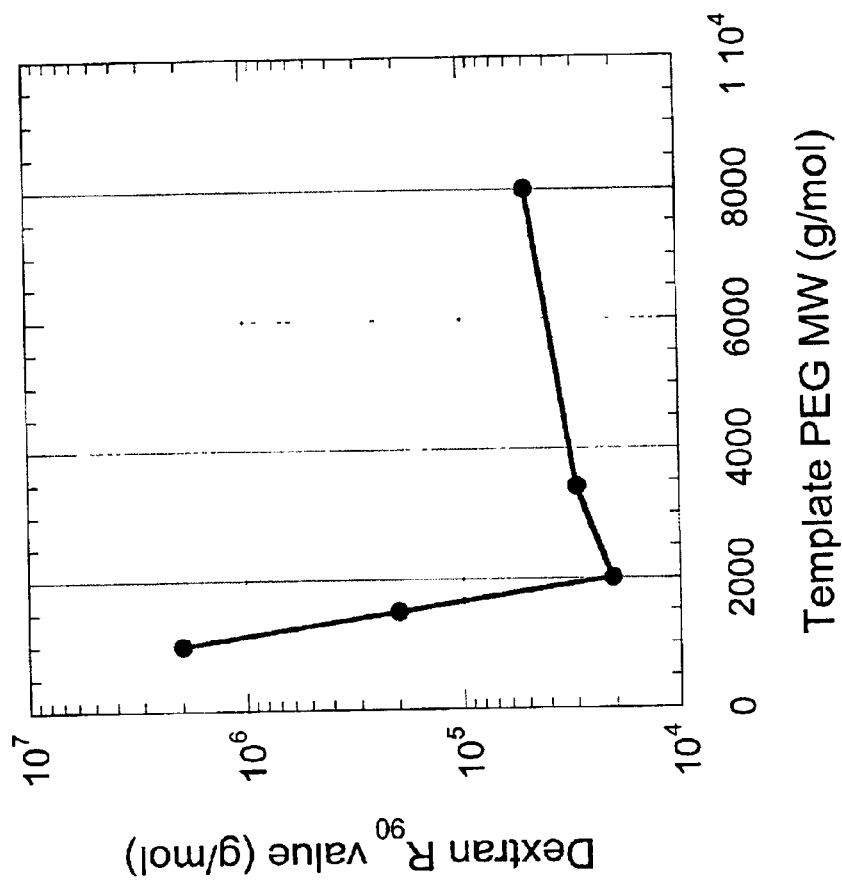

FIG. 20. Dextran $R_{90}$ value as a function of template molecular weight of carbon membrane.

Figure 21:
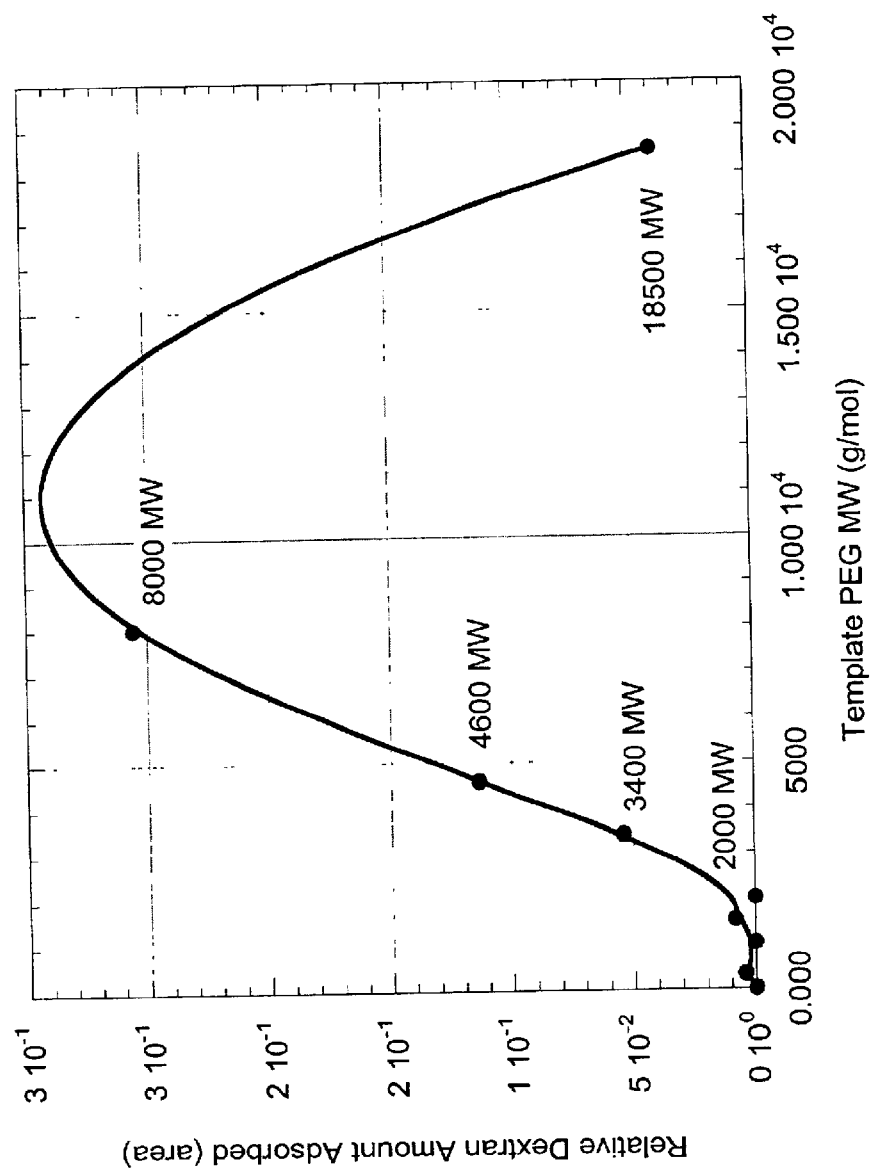

FIG. 21. Relative dextran adsorption from batch depletion on granular carbons synthesized using templates of 300 to 18500 g/mol of PEG.

Figure 22:
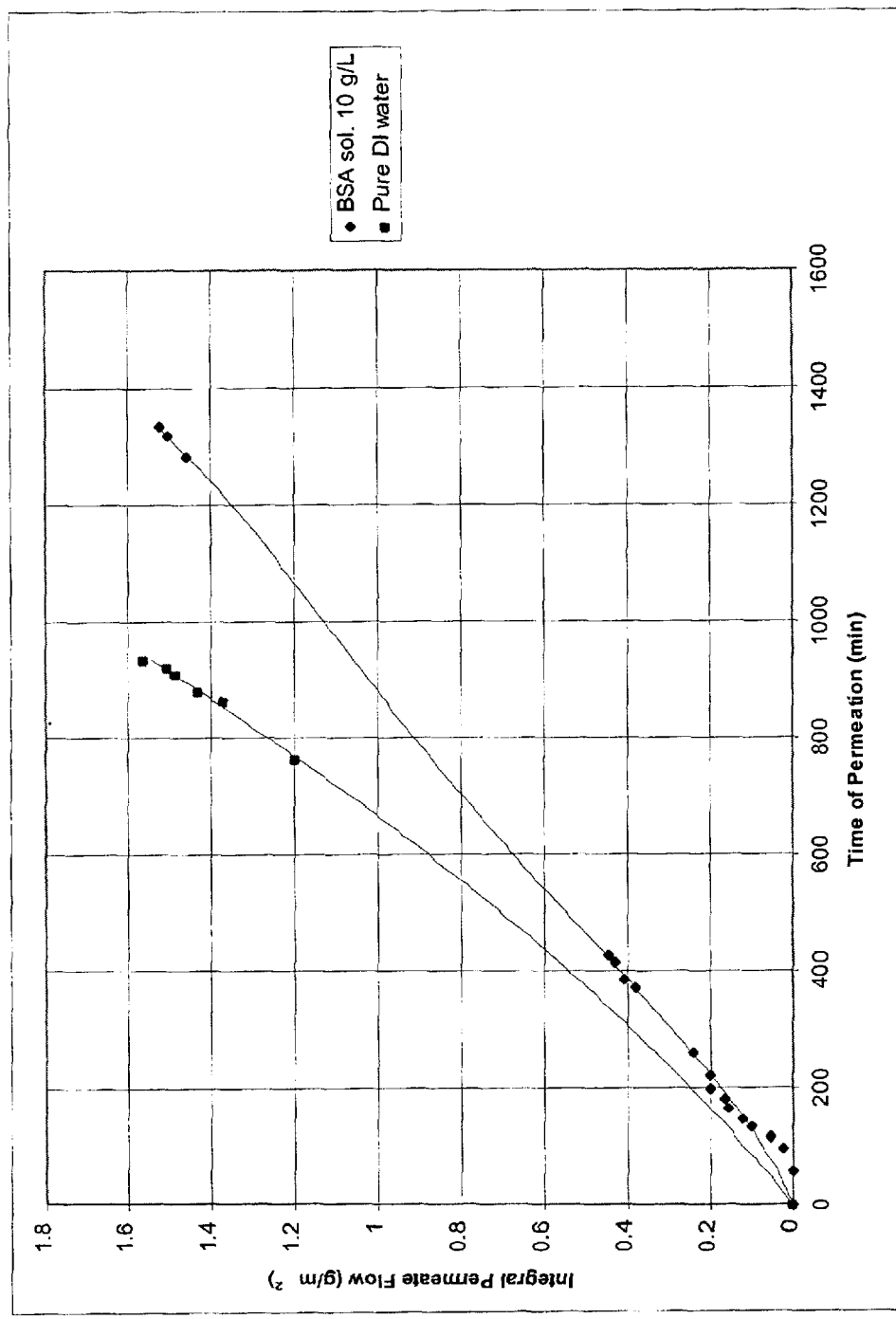

FIG. 22. Transient response of a dry porous carbon ultrafiltration membrane to pure water and BSA solution loadings (II.6 [M8000-7-0.074]).

Figure 23:
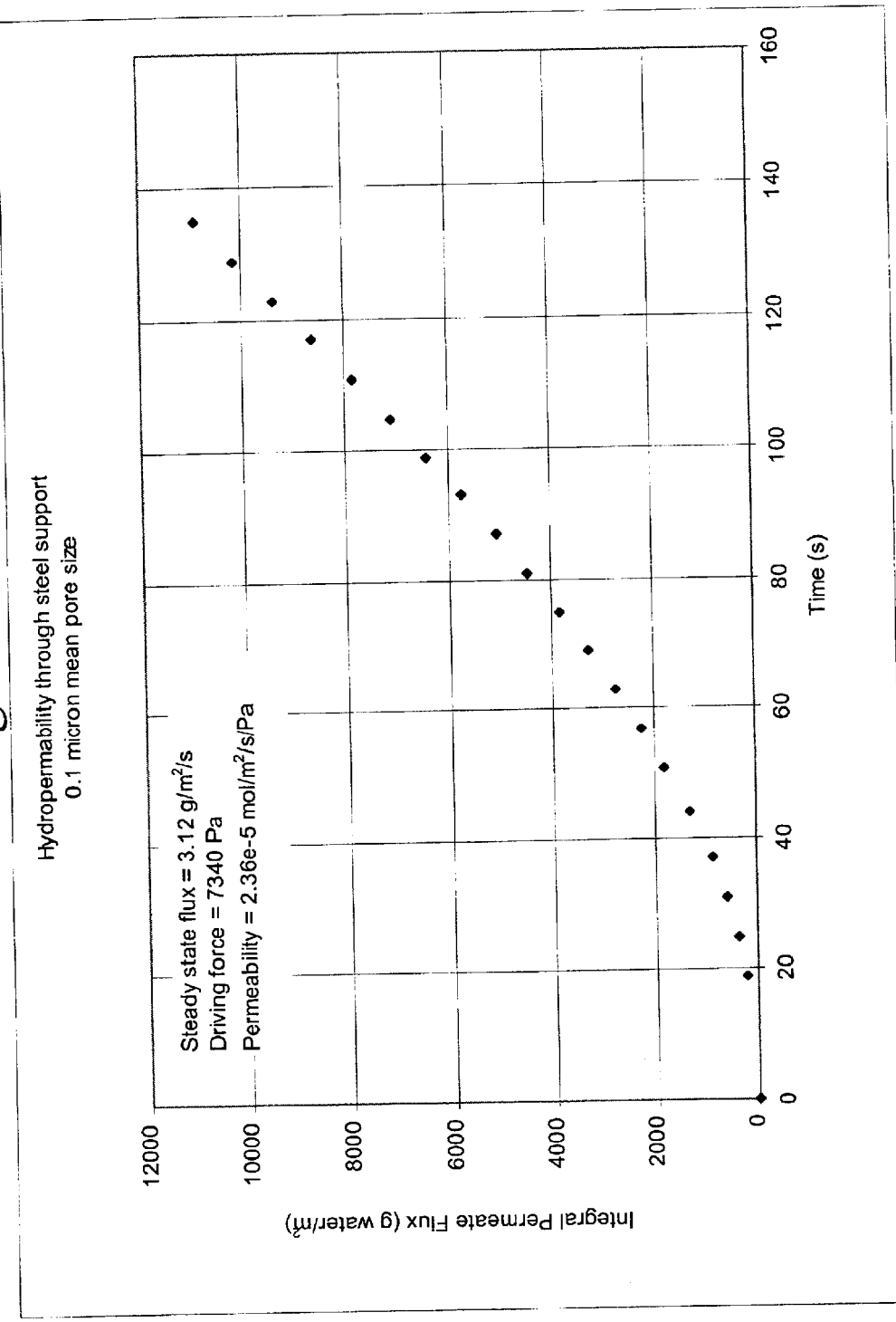

FIG. 23. Transient response of BSA aqueous solution through an uncoated stainless steel support (no carbon) to confirm lack of BSA retention.

Figure 24:
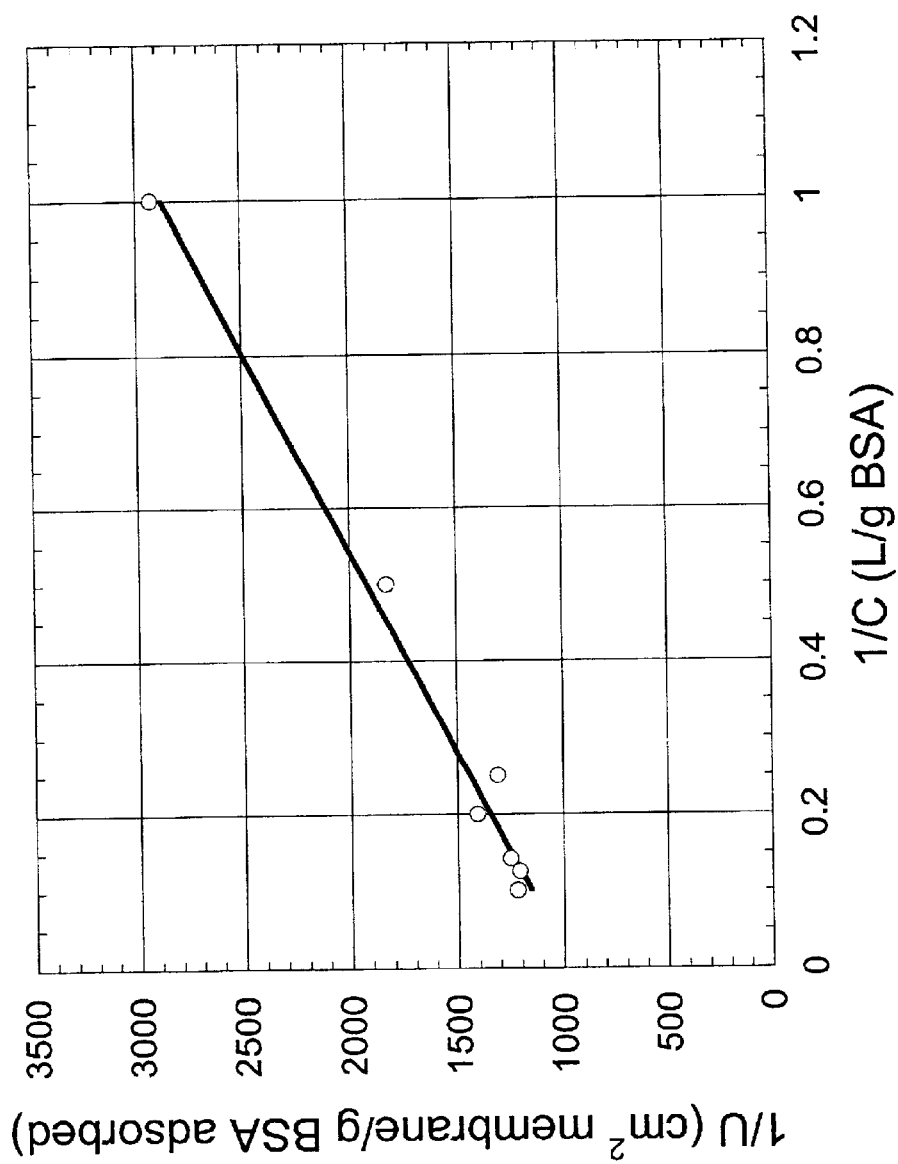

FIG. 24. Equilibrium adsorption of BSA at 4° C. on 600° C. 3:1 PFA:8000 amu PEG porous carbon.

DETAILED DESCRIPTION OF THE INVENTION

The supported mesoporous carbon ultrafiltration membranes of the present invention are synthesized on a porous support material. A polymeric precursor mixture containing a carbonizing and a noncarbonizing polymer precursor is deposited on the support. The coated support system is then pyrolyzed using a heating ramp and pyrolysis or "soak" temperature sufficient to pyrolyze the polymeric precursor mixture. Upon pyrolysis of the polymeric mixture a mesoporous carbon film is formed on the support. The noncarbonizing polymer creates the mesoporous size pores in the carbon material. Thus, the noncarbonizing polymer is commonly referred to as a template or templating polymer.

In a preferred embodiment, the porous support is metal, for example, a prefabricated porous stainless steel plate or tube formed by metal sintering. In a preferred embodiment of the present invention, the porous metal support has a pore size diameter range from 0.1 to 100 microns. In a preferred embodiment, the porous support has a first surface, a second surface, and a macroporosity within the support. In a more-preferred embodiment the porous support has a top surface and a bottom surface, and the macroporosity is within the support between the top and bottom surface. In embodiments where the supported mesoporous carbon membrane is in the shape of a tube, the top surface is understood to be the outside surface of the tube and the bottom surface is understood to be the inside surface of the tube. The support has at least one through-pore. A through-pore is a pore that connects the first surface of the support with the second surface of the support. In a preferred embodiment, the through-pore extends from the top surface to the bottom surface.

The polymeric precursor mixture contains a carbonizing polymer precursor such as poly(furfuryl alcohol) and a noncarbonizing template molecule polymer precursor such as poly(ethylene glycol). The polymeric precursor mixture is deposited onto the porous metal support using any of the methods known in the art for this purpose, such as spray deposition. The deposition may occur only on one surface of the support or on all surfaces of the support. Optionally, the deposition may occur on all surfaces of the support simultaneously. Additionally, the deposition may optionally occur on the entire support or only on a portion of the support.

In a preferred embodiment of the present invention, the supported mesoporous carbon membranes are prepared from a polymeric precursor mixture comprising poly(ethylene glycol) as the noncarbonizing template polymer precursor and poly(furfuryl alcohol) as the carbonizing polymer precursor. In a preferred embodiment, the weight ratio of PEG to PFA is from 1:3 to 3:1. In a more preferred embodiment, the weight ratio of PEG to PFA is 1:1. In yet another embodiment, the molecular weight of the PEG is from 1000 to 18500 amu. In a more preferred embodiment, the molecular weight of the PEG is from 2000 to 8000 amu. In a still more preferred embodiment of the invention, the molecular weight of the PEG is from 3400 to 8000. In a most preferred embodiment, the molecular weight of the PEG is about 8000 amu.

Upon deposition onto the support, a significant amount of the polymeric precursor mixture impregnates the pores of the support material as a result of the capillary pressure exerted by the pore walls. Thus, the polymeric precursor mixture is disposed in the macroporosity of the support. After the polymeric precursor mixture is applied to the support, the system is pyrolyzed at high temperature in a flowing inert-gas atmosphere with a carefully controlled heating ramp (typically 5° C./min) and pyrolysis ("soak") temperature (typically ranging from about 350° C. to 900° C.). A preferred pyrolysis temperature is in the range of from about 450° C. to 600° C. A highly-preferred pyrolysis temperature is about 600° C.

After pyrolysis, mesoporous carbon is formed on the surface and within the macroporosity of the support. The mesoporous carbon reduces the effective diameter of the macro pores in the support. In a preferred embodiment of the present invention, the procedure is repeated to build up a thin layer of carbon on the porous metal support. The pore walls of the support create the boundaries of the carbon membrane and give the supported mesoporous carbon membrane much greater strength than the graphite or ceramic membranes currently used for ultrafiltration. In a most preferred embodiment of the present invention, the above deposition process is performed one to three times.

CHARACTERIZATION OF THE MEMBRANES

Microscopy

Scanning electron microscopy was used to characterize the internal morphology of the membranes. Membrane cross sections were cut orthogonal to the support surface using a diamond-wafering saw. These sections were mounted in epoxy resin, polished, and given a coating of gold for imaging with a Hitachi S-4000 field emission scanning electron microscope. Imaging was performed on areas of this cross section external to and within the macroporosity of the stainless steel support and at various radii from the center of the disk-shaped membranes.

FIG. 1 is a scanning electron micrograph of a cross sections of the external porous carbon layer and the stainless steel support for a membrane synthesized using a 1:1 composition of PFA:8000 amu PEG at 600° C. with 6.5 mg/cm² of carbon per membrane area (II.6). The stainless steel 10 is visible in the bottom half of the image and the carbon layer 20 is the fractured surface on the top of this support. The separation or crack 30 between this layer and the support most likely occurred during preparation since the carbon was apparently securely fashioned to the support surface prior to cutting and the void is not filled with epoxy. The carbon layer 20 is 12 to 15 microns thick and relatively uniform over the membrane surface.

FIG. 2 is an example of external layer surface features that were evident along the carbon layer. These discontinuities 32 existed before preparation as the void spaces are filled with epoxy. The existence of these surface discontinuities along the external film 24 suggests that the carbon within the macroporosity of the support 22 provides a critical contribution to the sieving characteristics of the membrane.

FIG. 3 is a 0.5 micron scale image of the microstructure of the PFA/PEG carbon in the membrane cross section. Visible are pores 40 with diameters of about 10 nm. These pores are formed from carbonization of the poly(furfuryl alcohol) around the voids remaining after poly(ethylene glycol) decomposition. This mesoporous structure exists within the nanoporous carbon material deposited on the support. Porous carbon was also observed to be present on the opposite side of the support (the side opposite from the initial deposition) 26. Additionally, the carbon fills a substantial portion of the macroporosity within the support as well.

Determination of the Effective Mean Pore Size by Gas Transport

The membranes were characterized using single-component gas permeation to determine the effective mean pore size of the membrane in the orientation of the flow direction. By examining the pressure dependence of the observed flux with driving force pressure, information regarding the dominant diffusion mechanism under the experimental conditions can be obtained. This mechanism is in turn a strong function of the mean free path of the probe molecule compared to the pore width of the membrane.

Gas phase transport of He, Ar, $N_2$, $O_2$, $SF_6$, and $CO_2$ was used to characterize the selective porosity and integrity of the carbon membrane. A disc-shaped membrane prepared according to the invention (as detailed above), was sealed into a stainless-steel module using VITON™ gaskets and was set up to measure the transport of a single gas through the membrane.

At a time t=0, the probe gas was introduced to the top of the initially evacuated membrane at a pressure $P_0$. The permeate volume bounding the bottom of the membrane was sealed from vacuum at this time and the subsequent rise in pressure was used to evaluate the instantaneous derivative of the time-dependent flux through the membrane:

$$\frac{V_{pc}}{RT}(P(t) - P_{init}) = A \int_0^t N(t')dt'$$

where $V_{pc}$ is the volume of the permeate chamber, $P_{init}$ is the initial pressure in the chamber at t=0 and A is the area of the membrane. This pressure was measured using an MKS BARATRON pressure transducer (0–1000 torr range) and recorded using an interfaced PC which also controlled the start and duration of the experiment via electronically actuated solenoid valves. If the pressure rise in this volume is not permitted to exceed a minimum value, then the driving force across the membrane is essentially equal to the pressure loading. In this way, the steady state flux of the molecular probe can be measured as a function of the driving force pressure, $P_0$. Details concerning this technique of gas phase membrane characterization can be found in Strano and Foley (2000), *Deconvolution of Permeance through Supported Nanoporous Membranes*, AIChE Journal 46, 3, pp. 651–658.

FIG. 4a is the flux versus pressure for gases through an uncoated stainless steel 0.2 mm support showing both a high rate of permeation and low gas selectivity. A nanoporous carbon film pyrolyzed in the absence of polymer template shows a linear relationship between the flux and applied pressure for He, $O_2$, $N_2$, and Ar. See FIG. 4b. This permeation behavior is typical of PFA derived carbon membranes. See Strano and Foley (2000), Deconvolution of Permeance through Supported Nanoporous Membranes. AIChE Journal, 46,3, pp. 651–658. FIG. 4c is characteristic of gas permeation through a templated carbon membrane of the present invention, prepared using a mesoporous carbon membrane prepared using a polymeric precursor mixture having a 1:1 weight ratio of PFA to PEG (8000 amu) using the method described above, showing a quadratic dependence of the flux versus pressure and Knudsen gas selectivity at low pressure. The inventors have found that this characteristic is apparent on all PEG/PFA templated carbon membranes regardless of coating deposition mass or template size employed. Hence, the permeation results cannot be attributed to partially coated or partially formed gas separating nanoporous membranes shown in FIG. 4b.

For membranes having a mean pore size from about 100 nm to 1 nm, the mean pore size can be estimated by examining membrane gas permeability versus transmembrane pressure. The linear relationship yields intercepts equal to Knudsen permeabilities with slopes inversely proportional to the gas viscosity. See FIG. 5. The flux through the membrane is written as:

$$J = \left(K_o + \frac{B_o}{\eta}\overline{p}\right)\Delta p$$

The structure factor $B_0$ is proportional to the square of the mean pore size:

$$B_o = \frac{\varepsilon}{\tau^2 \alpha} d_m^2 \qquad (1)$$

with α=2.5 for consolidated media. See Carman (1956), Flow of Gases through Porous Media. The Knudsen permeability $K_0$ can be written as:

$$K_o = \frac{4\beta\varepsilon}{3\tau^2\alpha}d_m\sqrt{\frac{8RT}{M}} \quad (2)$$

where β is 0.8 for consolidated media. See Carman (1956), Flow of Gases through Porous Media. A ratio of equations (1) and (2) can be calculated from permeability data and used to estimate the mean pore size, $d_m$, of the membrane.

As seen in TABLE A, the mean effective pore sizes of mesoporous supported carbon membranes of the present invention tend to decrease with decreasing PEG template polymer molecular weight.

TABLE A

Mean effective pore sizes of membranes measured by gas permeation.

| PEG Molecular Weight (g/mol) | Mean Effective Pore Size (nm) | $N_2$ Knudsen Permeability (mol/m/s/PA) |
|---|---|---|
| 8000 | 26.1 | $3.69 \times 10^{-12}$ |
| 3400 | 13.7 | $3.50 \times 10^{-13}$ |
| 1500 | 10.3 | $2.22 \times 10^{-12}$ |

Methyl Chloride Absorption Measurement of the Pore-Size Distribution

The complete pore-size distributions of both the mesoporous carbon material used in the present invention and nanoporous carbon material were measured using unsupported membrane material (PFA/PEG carbons) and carbon synthesized in the absence of a PEG additive. The pore size distributions were analyzed using a technique adapted from Mariwala and Foley. See Mariwala and Foley (1994), *Calculation of Micropore Sizes in Carbogenic Materials From the Methyl-Chloride Adsorption-Isotherm*, Industrial & Engineering Chemistry Research, 33, 10, pp. 2314–2321. Stevens presents the details concerning the experimental apparatus used and the algorithm and theoretical developments used to obtain the micro-, meso-, and macro-scale pore size distributions. See Stevens (1999), *Cesium/Nanoporous Carbon Composite Materials: Synthesis, Characterization, and Base Catalysis*, Ph.D. Thesis, University of Delaware, Chap. II. The technique employs methyl-chloride as a model adsorbate and uses the semi-empirical relation for a model, graphitic slit-shaped pore for the pore distribution below 2 nm and the Kelvin equation for the measurement of larger pores. It is important to note that this type of experiment yields an isotropic pore size distribution that is independent of the flow direction through the material.

The equipment used was a modification of the apparatus designed by Mariwala and Foley (1994). A computer-controlled gravimetric adsorption apparatus was constructed comprising a C.I. Microbalance having a sensitivity of 0.1 μg. The components were interfaced with a computer running an automated system written with the LABWINDOWS CVI programming environment. The pressure monitoring setup consisted of two temperature-correcting pressure transducers having ranges of 0–10 torr and 0–1000 torr, a BALZERS turbo pump backed with an ALCATEL two-stage rotary-vane pump, and three fast-acting solenoid valves for the lines connected to the feed, vacuum, and vent streams. This system could maintain static pressures between $10^{-3}$ and 700 torr and achieve set points within 0.1 torr. Temperature control within 0.1° K of the set point was achieved with a NESLAB RTE 140 digital recirculating bath that flowed chilled glycol through a heavily-insulated sealed jacket surrounding the sample hang-down tube. The cooling jacket temperature varied by less than 0.5° K from the temperature in the recirculating bath and was used in the final pore-size calculations. Methyl chloride used in the study was obtained from Matheson Gas Co. Further details concerning this apparatus are in Stevens (1999).

Powdered unsupported PFA/PEG carbon membrane samples, weighing about 300 mg, were loaded into a quartz sample pan and connected to the sample side of the microbalance. The hang-down tube was attached and counterweights were placed in the pan on the opposite balance arm until it was within 10 mg of neutral (indicating zero weight). The system was sealed and evacuated to less than $10^{-3}$ torr, the furnace was attached, and the sample was heated to 623° K for 4 hours for drying. After drying, the glycol jacket was installed and the temperature control activated. When the temperature reached the desired starting temperature, the computer began the auto-adsorption cycle. As the computer adjusted the pressure and temperature to match those loaded from a user file, an algorithm determined if the sample had reached equilibrium by examining the slope of the weight change in the recent past. Disturbances caused by external vibrations or electromagnetic noise were digitally filtered from the input signal.

The adsorption proceeded as follows: at 303° K, the pressure was increased stepwise from 4.2–200 torr to capture the nanopore structure in detail (0.42–0.75 nm); where appropriate, at 200 torr the temperature was dropped in 5 degree increments to 248° K to obtain detail on the small mesopore region (0.75–1.6 nm); at 248° K the pressure was increased stepwise to complete the small mesopore region (about 2 nm) at 220 torr and obtain detail on the macropore region, with the completion of the experiment at 700 torr (54 nm).

The resulting pore size distribution of PFA/PEG mesoporous carbon membranes, prepared according to the method described above using a polymer precursor composition having a weight ratio of 3:1 PFA to PEG (8000 amu), the membrane pyrolyzed at 850° C., is shown in FIG. 6. Note that the distribution is bimodal with modes in the nano- and mesopore regions. The second mode at 18.1 nm is attributed to the PEG noncarbonizing templating polymer precursor during pyrolysis because it is known that a pure PFA precursor yields only a nanoporous solid useful for small molecular separations but not for ultrafiltration. In comparison, the pore-size distribution of a nanoporous carbon membrane, such as one prepared according to Foley et al., U.S. Patent No. 5,972,079, is shown in FIG. 9. This membrane has a single pore size mode in the nanoporous range.

For the supported mesoporous carbon membranes of the present invention, the larger pores (greater than 1 nm) are responsible for the ultrafiltration properties of the membrane and the ability of the membrane to efficiently permeate liquid water. During formation of the membranes according to the present invention, the application of successive coats of the liquid polymeric precursor composition blocks or closes the pores of the support and replaces these pores with those of the templated carbon.

FIGS. 7 and 8 show similar pore-size distributions for PFA/PEG membranes having a weight ratio of 3:1 PFA to PEG that were pyrolyzed at 850° C. The plot shown in FIG. 7 shows the pore-size distribution for a membrane prepared with PEG having a molecular weight of 3400 amu. The plot shown in FIG. 8 shows the pore-size distribution for a membrane prepared with PEG having a molecular weight of 1500 amu. From these two figures, it can be determined that decreasing the molecular weight of the noncarbonizing templating polymer precursor, e.g. PEG, causes a decrease in the mode of the ultrafiltration-range pore size distribution. Consequently, by manipulation of the molecular weight of the noncarbonizing polymer additive, the inventors have unexpectedly found that one can tailor the pore-size properties of the resulting templated nanoporous carbon membranes.

Retention Properties Measured by Ultrafiltration of Polydisperse Dextrans

The retention properties of the mesoporous carbon membranes were measured using ultrafiltration of polydisperse dextrans. Dextrans having average molecular weights of $2 \times 10^6$, $1.7 \times 10^5$, $7.0 \times 10^4$, $3.9 \times 10^4$, and $9.9 \times 10^3$ g/mol were added in equal mass ratios to create a 10 g/L solution in a phosphate buffer solution. The solvent was synthesized by the addition of monobasic ($NaHPO_4$) and dibasic ($NaH_2PO_4$) phosphate buffers to maintain solution pH at 7.4±0.3. When applicable, a one percent by weight solution of methanol was added to the solvent to prevent bacterial contamination. Gel permeation chromatography (GPC) was performed on the samples. Analysis was carried out by direct injection using distilled water with an eluent flow of 0.1 L/min. These molecular weight fractions of dextrans were also injected separately in order to obtain a calibration of column retention time versus molecular weight of dextran.

Membrane separation was carried out using a dead end filtration setup. A 50 ml volume of dextran solution was loaded above the carbon membrane in a 30 mm AMICON stirred cell. An attached argon line applied gas pressure to the solution above the membrane and the permeate was collected in 30 ml vials weighted continuously using a laboratory balance. A series of samples was collected after initial pressurization for each membrane. The permeate and retentate solutions were tested to determine the distribution of dextran molecular weights retained and permeated by the membrane. Permeate samples taken over time were compared to insure that a pseudo-steady state operation had been achieved.

Granular carbon membrane samples were prepared using the procedure described above for making mesoporous carbon membranes, except that the polymeric precursor mixture was poured into a quartz boat and pyrolyzed as a bulk solution. These samples were analyzed for total dextran adsorption capacity using a batch depletion method. Each carbon was ground to 60/140 mesh and suspended in a water solution. After settling, the remaining solution was decanted to remove fine particles. The process was repeated until all fine particles were removed. A mass of 0.5 g of carbon was sealed with 30 ml of the sample polydispersed dextran solution as described above in a PYREX vial. Several carbon membrane samples were prepared using a 1:1 weight ratio of PFA to PEG, wherein the PEG had molecular weights of 300, 1000, 1500, 2000, 3400, 4600, 8000, and 18500 amu. The samples were pyrolyzed using the synthesis method described above. Sealed vials were vigorously agitated for 32 hours, after which the solutions were passed through a 1 $\mu$m filter and analyzed using GPC as described above. The distribution of the amount of dextran remaining in the solution above the carbon membrane was integrated and normalized and then compared to the integral of the original solution curve.

The correlation between the size and distribution of the pores in the carbon membranes and the molecular weight of the PEG template polymer precursor can be observed using competitive dextran permeation. See Nobrega, Balmann (1989), Transfer of dextran through ultrafiltration membranes: a study of rejection data analyzed by gel permeation chromatography, Journal of Membrane Science, 45, pp. 17–36. FIGS. 10 through 14 are the molecular weight distributions for retained and permeated dextran solutions during dead end filtration. These curves were obtained under steady state permeation conditions as measured by overall transient solution flux and GPC analysis of solutions taken versus time. FIG. 10 shows an absence of a correlation between dextran retention and dextran molecular weight for a carbon membrane prepared using 1000 amu PEG. As the molecular weight of the PEG increases, the lack of selectivity becomes less pronounced as the retention decreases significantly for higher molecular weight dextrans. However, a quantitative comparison between FIGS. 10 through 14 requires knowledge of the membrane flux employed compared with the dextran mass transfer coefficient across the boundary layer above the membrane. The membrane flux for the carbon membranes of the present invention was determined below.

Under steady state filtration conditions, concentration polarization can magnify the driving forces of retained solutes and yield fictitiously lower partial rejection coefficients for a given membrane. Several researchers have corrected the observed partial rejection coefficients obtained under these conditions to yield actual rejection coefficients—those applicable in the limit of zero flux—through the use of a stagnant film and solute mass transfer model. See Zydney and Zeman (1996), Microfiltration and Ultrafiltration. Principles and Applications. This analysis requires knowledge of dextran free solution diffusion coefficients, AMICON stirred cell operating conditions and geometry as well as membrane flux. A correlation of free solution diffusion coefficient versus dextran molecular weight has been published by Granath. See Granath (1958), Solution properties of branched dextrans. J. Colloid Interface Sci., 13, pp. 308. TABLE B summarizes the relevant parameters used in the analysis.

TABLE B

Parameters used for stagnate film/concentration polarization correction.

| Water kinematic viscosity | $\mu$ | $8.50 \times 10^{-7}$ | $m^2/s$ |
|---|---|---|---|
| Cell Radius | b | 0.0125 | m |
| Stir speed | $\omega$ | $2\pi\, 5$ | 1/s |
| Chi for AMICON 30 mm cell[1] | $\chi$ | 0.23 | |
| Free solution diffusivity[2,3] | $D_\infty$ | a = $7.67 \times 10^{-9}$ | b = $-0.478$ $m^2/s$ |
| Reynolds number[3] | Re | a = $5.77 \times 10^3$ | b = 0.000 |
| Schmitt number[3] | Sc | a = $1.11 \times 10^2$ | b = 0.478 |
| Sherwood number[3] | Sh | a = 148.0 | b = 0.158 |
| Mass transfer coefficient[3] | k | a = $9.1 \times 10^{-5}$ | b = $-0.320$ m/s |

[1]Smith, Colton (1968), Convective transport in a batch dialyzer: determination of the true membrane permeability from a single measurement. AIChE Symp. Ser., 64, pp. 45.
[2]Granath (1958), Solution properties of branched dextrans. J. Colloid Interface Sci., 13, pp. 308.
[3]= a(dextran molecular weight)$^b$ Under dead end filtration conditions in a stirred cell, a boundary layer of thickness $\delta$ develops on the surface of the membrane with a surface concentration of solute, $C_w$, increasing from the bulk concentration $C_b$ due to polarization effects. The solvent flux through the membrane is:

$$J_v = \frac{k}{\delta} \ln\left(\frac{C_w - C_p}{C_b - C_p}\right) \quad (3)$$

where k is the mass transfer coefficient of dextran and a function of dextran molecular weight and $C_p$ is the permeate solute concentration. Measuring $J_v$ and $C_p$ at a particular $C_b$, one can calculate $C_w$ using Equation (3). The value of k can be obtained from:

$$Sh = \chi Re^{0.567} Sc^{0.33}$$

where Sh, Re, and Sc are the Sherwood, Reynolds, and Schmitt numbers respectively. Values for these parameter groupings as a function of molecular weight appear in TABLE C. Zydney and Zeman provide a more detailed discussion of the analysis and the assumptions involved. See Zydney and Zeman (1996), Microfiltration and Ultrafiltration. Principles and Applications.

FIGS. 15 through 19 show the observed $(1-C_p/C_b)$ and actual $(1-C_p/C_w)$ rejection coefficients as a function of dextran molecular weight for membranes synthesized using the six different template PEG sizes. FIG. 15 presents the results for a 1000 amu PEG carbon membrane showing a lack of dextran retention with respect to molecular weight indicating large, nonselective pores exist across the film. The low hydropermeabilities of the membranes of the present invention, see, e.g., TABLE C, suggest low overall porosity in the films as well and that the lack of selectivity is likely due to a relatively small number of large cracks spanning the membrane layer. The templating of nanoporous carbon using a 1:1 weight ratio of PFA to PEG has been observed by the inventors to be effective only at molecular weights of 2000 amu and higher, although by increasing the concentration of the low-molecular weight templating polymer precursors may prevent this cracking effect. See Lafyatis, Tung (1991), Poly(Furfuryl Alcohol)-Derived Carbon Molecular-Sieves—Dependence of Adsorptive Properties On Carbonization Temperature, Time, and Poly(Ethylene Glycol) Additives. Industrial & Engineering Chemistry Research, 30, 5, pp. 865–873. At low PEG molecular weight values, it is possible that volatilization of the template begins to seriously diminish the concentration of PEG in the film near carbonization temperatures. This then causes the carbonized film to assume the properties of a non-templated nanoporous carbon membrane. It has been well established that such non-templated nanoporous membranes require several coats before a crack free layer can be constructed. See Acharya, Raich (1997), Metal-supported carbogenic molecular sieve membranes: Synthesis and applications. Industrial & Engineering Chemistry Research, 36, 8, pp. 2924–2930; and Shiflett and Foley (1999), Ultrasonic Deposition of High Selectivity Nanoporous Carbon Membranes. Science, 285, 17, pp. 1902–1905. It has also been noted that accessibility of the mesopore distribution becomes hampered at lower template polymer molecular weights. See Lafyatis, Tung (1991), Poly(Furfuryl Alcohol)-Derived Carbon Molecular-Sieves—Dependence of Adsorptive Properties On Carbonization Temperature, Time, and Poly (Ethylene Glycol) Additives. Industrial & Engineering Chemistry Research, 30, 5, pp. 865–873. The curves for 1500 amu PEG (FIG. 16) and 2000 amu PEG (FIG. 17) show an increase in membrane selectivity, however not in a clearly controllable manner. In particular, FIG. 17 shows a lack of reproducibility for four membranes synthesized with the same carbon deposition mass. For the same reasoning, higher molecular weight templated membranes show a propensity towards cracking. The membrane produced in Example I.13 [M2000-4-0.019] represents a porous film in the absence of film cracking and shows a significantly enhanced dextran retention compared to the membranes shown in FIG. 15.

Problems of film cracking and dextran retention reproducibility were observed to diminish using higher molecular weight template polymers. At higher molecular weights, the retention properties of the films are expected to instead be dominated by the porosity of the carbon rather than by any cracks in the carbon film. FIGS. 13 and 14 show excellent reproducible behavior for membranes prepared using 3400 and 8000 amu PEG respectively. Retention properties tend to increase from those implied in FIGS. 16 and 12. The membrane prepared in Example I.3 [M8000-3-0.022] is the result of two successive coating and carbonization cycles and shows an increase in retention behavior likely from a reduction in pore size after the initial coat.

A summary of FIGS. 15 through 19 is provided by FIG. 20. Here, the molecular weight of dextran above which 90% of the original solution is rejected (the conventional $R_{90}$ value) is plotted as a function of PEG molecular weight. The plot shows an increase in dextran $R_{90}$ with increasing PEG molecular weight starting from 2000 MW PEG template size. Below this cutoff, the selectivity increases sharply with decreasing template size as membrane transport becomes dominated by film cracks and defects. Membranes in this study were synthesized using a 1:1 weight ratio of PFA to PEG and the inventors believe that it is likely that increasing the PEG concentration at lower PEG molecular weights will extend the sharp transition in FIG. 20 to lower molecular weights.

Results of the batch depletion dextran adsorption yield relative values of assessable pore volume of various carbons and should clarify the observations presented above. FIG. 21 shows a plot of relative dextran amount adsorbed versus PEG molecular weight used during carbon membrane synthesis. The smoothed curve is present only as a guide for the reader. The results show negligible dextran uptake at PEG molecular weight values of 2000 amu and below. FIG. 21 also shows a substantial increase in the accessible surface area at larger template sizes. The inventors believe that there is a suggested maximum in the dextran adsorption uptake near 10000 amu PEG. At 18500 amu PEG, the dextran absorption value falls to those observed with membranes prepared from 3400 amu PEG. The decrease in dextran adsorption at high PEG molecular weights may be related to both a decrease in the rate of pyrolysis of the PEG and the rate of volatilization of the template polymer with increasing molecular weight. The initial portion of the curve in FIG. 20 correlates with the observations from gas permeation and dextran ultrafiltration studies discussed above. The lack of dextran uptake at low PEG molecular weights is believed to be due to a decrease in the mesopore connectivity. This belief is supported by the methyl chloride adsorption measurements discussed above. These results clearly suggest that the mesoporosity is indeed formed during carbonization, but substantial portions are rendered inaccessible under competitive dextran adsorption conditions.

Large Scale, High Volumetric Throughput Of Macromolecular Separation

The advantages of the current invention allow ultrafiltration to be performed on a large scale with high throughput and with characteristics that are advantageous to a robust industrial process. The advantages of the present invention are: (1) the supported membranes can be synthesized in the form of tubes or tube bundles encased in a shell; (2) the membranes are stable at high temperatures and can be steam sterilized and cleaned without adversely affecting the permeation properties; and (3) the membranes can be operated at high pressures, providing greater separation driving force, consequently the fluxes are higher. Each of these advantages is discussed in more detail below.

First, tubular stainless steel bundles are designs commonly found in industrial applications. Membranes in this form are not only stable at higher operating pressures compared to a hollow fiber, i.e., unsupported, membrane, but also tubular can easily be connected to existing process piping using common methods. Hollow fiber ultrafiltration membranes require a transition in materials between the process tubing and the membrane fiber. This material tran sition frequently is the source of leaks and fissures in a hollow fiber module. Because a preferred embodiment of the present invention uses a tubular porous stainless steel support, the tube can easily be joined to the process tubing using conventional welding techniques or other well known connection methods.

Second, steam sterilization is an attractive method of cleaning and disinfecting membranes in an industrial setting. High pressure steam is readily available and does not produce toxic or corrosive waste streams, unlike harsh chemical cleaning agents that are used with conventional polymeric ultrafiltration membranes. Because the membranes of the present invention are stable at the temperatures and pressures of steam delivery they are highly suited for steam sterilization.

Last, in theory, operating at higher delivery pressures should proportionately increase membrane throughput. There are instances, however, when the retained molecules foul the membrane in such a way that the flux does not increase with increased driving force pressure. A limiting flux is reached in these cases, due to the formation of a gel layer on the membrane surface. Nonetheless, in principle, the ability to operate at higher pressures than those possible with conventional ultrafiltration membranes is advantageous. Accordingly, the present invention allows for more efficient separations compared to the prior art.

EXAMPLES

Example I

Synthesis of Mesoporous Supported Carbon Membranes

A polymeric precursor mixture was prepared from poly (furfuryl) alcohol ("PFA") (Durez Resin #16470) available from Occidental Chemical Corporation as the carbonizing polymer precursor. The PFA resin has a specific gravity of 1.21 and a viscosity of 200 cp. at 25° C. and 5 cp. at 80° C. The noncarbonizing template polymer precursor used in the polymeric precursor mixture was poly(ethylene glycol) ("PEG"). The PEG resin is available from Aldrich Chemical Company in molecular weights ranging from 300 to 18500 amu. The PEG resin used in these examples had a melting point between room temperature and 80° C.

Examples I.1 to I.15 were prepared using a PFA/PEG/ acetone precursor mixture that was obtained by combining a PFA resin with a PEG in a 1:1 weight ratio at 70° C. and subsequent dilution in acetone forming a stable mixture at room temperature with a viscosity near 5 cp. The PEG used to prepare these examples had an average molecular weight from 1000 to 8000 depending on the particular example. The polymeric precursor mixture was spray deposited onto circular stainless steel supports supplied by Mott Metallurgical Company that had been sonicated in acetone. The stainless steel supports have a 0.2 $\mu$m pore size, a surface area of 11.4 cm$^2$, and a thickness of 1 mm. Approximately 200 mg of the PFA/PEG/acetone polymeric precursor mixture (measured wet) was deposited onto each support. The coated supports were then pyrolyzed in a stream of flowing helium at 50 sccm using a heating ramp of 5° C./min up to the pyrolysis temperature of 600° C. The coated supports were held for two hours at the pyrolysis temperature, and then allowed to cool to room temperature. The final carbon mass deposited on each support was approximately 20 mg. TABLE C presents the data on the membranes produced in these examples. Membrane labels contain the PEG template molecular weight and total coat mass of carbon for each sample.

The processing throughput of the membranes was found to be proportional to the amount of precursor applied and subsequently deposited on the membrane. The hydropermeability and BSA retention properties of the prepared membranes are also shown in TABLE C. The mass-deposition amounts of the membranes produced according to the invention ranged from 0.7 to 8 mg/cm$^2$ porous carbon per membrane area.

TABLE C

Summary of synthesis and performance characteristics for membranes used in Examples I.1 to I.15. Labels inside the brackets are as follows: M(PEG MW)-(Sample No.)-(Carbon Mass in grams).

| Example | MW PEG (amu) | Initial Weight Support (g) | Wet Weight Support (g) | Net Carbon Weight (g) | Pressure Applied (psig) | Water Flux (m/s) | Water Permeance (m/s/Pa) | Water Permeance (g/s/m$^2$/Pa) |
|---|---|---|---|---|---|---|---|---|
| I.1 [M8000-1-0.021] | 8000 | 10.5107 | 10.6393 | 0.0210 | 50.5 | $1.8 \times 10^{-06}$ | $5.1 \times 10^{-12}$ | $4.0 \times 10^{-06}$ |
| I.2 [M8000-2-0.018] | 8000 | 10.8591 | 10.9768 | 0.0180 | 54 | $1.1 \times 10^{-05}$ | $2.9 \times 10^{-11}$ | $2.4 \times 10^{-05}$ |
| I.3 [M8000-3-0.022] | 8000 | 10.4478 | 10.5800 | 0.0220 | 54 | $1.8 \times 10^{-06}$ | $4.7 \times 10^{-12}$ | $3.8 \times 10^{-06}$ |
| I.4 [M1500-1-0.019] | 1500 | 10.4659 | 10.5728 | 0.0190 | 55 | $5.9 \times 10^{-07}$ | $1.5 \times 10^{-12}$ | $1.2 \times 10^{-06}$ |
| I.5 [M3400-1-0.019] | 3400 | 10.7327 | 10.8409 | 0.0188 | 75 | $8.3 \times 10^{-07}$ | $1.6 \times 10^{-12}$ | $1.4 \times 10^{-06}$ |
| I.6 [M3400-2-0.016] | 3400 | 10.2860 | 10.3696 | 0.0161 | 75 | $8.3 \times 10^{-07}$ | $1.6 \times 10^{-12}$ | $1.4 \times 10^{-06}$ |
| I.7 [M3400-3-0.018] | 3400 | 10.5444 | 10.6481 | 0.0180 | 75 | $8.3 \times 10^{-07}$ | $1.6 \times 10^{-12}$ | $1.4 \times 10^{-06}$ |
| I.8 [M4600-1-0.019] | 4600 | 10.6297 | 10.7213 | 0.0185 | 47 | $4.6 \times 10^{-08}$ | $1.4 \times 10^{-13}$ | $1.1 \times 10^{-07}$ |
| I.9 [M4600-2-0.017] | 4600 | 10.4070 | 10.4960 | 0.0165 | 47 | $4.8 \times 10^{-08}$ | $1.5 \times 10^{-13}$ | $1.2 \times 10^{-07}$ |
| I.10 [M2000-1-0.019] | 2000 | 10.6382 | 10.7455 | 0.0189 | 50 | $2.0 \times 10^{-08}$ | $5.6 \times 10^{-14}$ | $4.4 \times 10^{-08}$ |
| I.11 [M2000-2-0.019] | 2000 | 10.4353 | 10.5340 | 0.0190 | 50 | $1.3 \times 10^{-07}$ | $3.8 \times 10^{-13}$ | $3.0 \times 10^{-07}$ |
| I.12 [M2000-3-0.019] | 2000 | 10.3555 | 10.4623 | 0.0190 | 50 | $8.8 \times 10^{-08}$ | $2.5 \times 10^{-13}$ | $2.0 \times 10^{-07}$ |
| I.13 [M2000-4-0.019] | 2000 | 10.6816 | 10.7785 | 0.0189 | 50 | $1.0 \times 10^{-07}$ | $3.0 \times 10^{-13}$ | $2.4 \times 10^{-07}$ |
| I.14 [M1000-1-0.029] | 1000 | 10.5297 | 10.6695 | 0.0288 | 50 | $1.7 \times 10^{-07}$ | $5.0 \times 10^{-13}$ | $3.9 \times 10^{-07}$ |
| I.15 [M1000-2-0.023] | 1000 | 10.7057 | 10.8189 | 0.0227 | 50 | $5.7 \times 10^{-08}$ | $1.6 \times 10^{-13}$ | $1.3 \times 10^{-07}$ |

Example II

Synthesis of Mesoporous Supported Carbon Membranes

Examples II.1 to II.17 were prepared using the method of Examples I.1 to I.15 using a pyrolysis temperature of from 450° C. to 600° C. and a PEG molecular weight ranging from 1500 amu to 8000 amu. The deposition of the polymeric precursor mixture ("coats") was repeated in some examples as shown in TABLE D.

TABLE D

Preparation of Examples II.1 to II.17. Labels inside the brackets are as follows: M(PEG MW)-(Sample No.)-(Carbon Mass in grams).

| Example | Pyrolysis Temp. (° C.) | Molecular Weight PEG (amu) | Number of Polymeric Precursor Coats | Weight of Deposited Carbon (mg/cm$^2$) | 1/Water Perm. (Pa m$^2$ s)/mg |
|---|---|---|---|---|---|
| II.1 [M8000-4-0.015] | 450 | 8000 | 1 | 1.3 | 77.0 |
| II.2 [M8000-1-0.021] | 500 | 8000 | 1 | 1.9 | 249.5 |
| II.3 [M8000-2-0.018] | 600 | 8000 | 2 | 2.1 | 42.5 |
| II.4 [M8000-5-0.029] | 600 | 8000 | 2 | 2.5 | 23.7 |
| II.5 [M8000-6-0.025] | 600 | 8000 | 2 | 2.2 | 23.5 |
| II.6 [M8000-7-0.074] | 450 | 8000 | 2 | 6.5 | 16362.0 |
| II.7 [M8000-3-0.022] | 600 | 8000 | 1 | 1.0 | 27.9 |
| II.8 [M8000-8-0.008] | 600 | 8000 | 1 | 0.7 | 9.7 |
| II.9 [M8000-9-0.008] | 600 | 1500 | 1 | 0.7 | 98.6 |
| II.10 [M1500-2-0.048] | 600 | 1500 | 1 | 4.2 | 802.7 |
| II.11 [M1500-3-0.084] | 600 | 1500 | 1 | 7.4 | 1530.0 |
| II.12 [M1500-1-0.019] | 600 | 1500 | 1 | 1.7 | 487.2 |
| II.13 [M1500-4-0.022] | 600 | 1500 | 1 | 1.9 | 1365.0 |
| II.14 [M1500-5-0.019] | 600 | 1500 | 1 | 1.7 | 19.1 |
| II.15 [M1500-6-0.019] | 600 | 1500 | 1 | 0.8 | 17.0 |
| II.16 [M3400-4-0.015] | 600 | 3400 | 1 | 1.3 | 737.2 |
| II.17 [M3400-5-0.013] | 600 | 3400 | 1 | 1.1 | 202.9 |

Example III
Protein Retention During Ultrafiltration

Bioreactors are often operated in an industrial or laboratory process to produce a particular type of protein. For isolation and separation of the desired protein from waste products and other components of the reactor, it is desirable to have a downstream process that will retain the protein while processing the aqueous solvent. A membrane process in the form of this invention can be used to conduct such a separation. This example serves to experimentally verify that the invented membrane can be used in a traditional ultrafiltration capacity.

The apparatus used to perform the aqueous separation of the protein solution is described as follows. Flat-plate porous carbon membranes, having an area of 11.4 cm$^2$, disposed on disc-shaped 0.8 mm thick stainless steel supports (supplied by Mott Metallurgical Company, Part No. 1100-8.5-10-0.2) and having a 0.2 μm pore size, were synthesized using the materials and procedures disclosed above for Examples II0.1 to II0.17. During testing, the membranes were sealed into a stirred cell module (available from Millipore, Inc., Bedford, Mass., catalog number 5122) comprising a vessel and a stirrer. The supported mesoporous carbon membrane was clamped between a rubber O-ring and plastic base of the cell with 50 ml of stirred solution to be separated above the membrane surface. The cell was equipped with a supply port through which additional solution can be fed or gas pressure can be supplied. Gas pressure was supplied using helium and regulated at the cylinder between 14.7 to 70 psig.

Preparation of the solution to be separated required the addition of a known amount of anhydrous bovine serum albumin ("BSA") to 50 ml of de-ionized ("DI") water to achieve the desired concentration. Ultrafiltration of proteins is known to be strongly dependent upon both pH and ionic strength. Monobasic and dibasic phosphate buffers were added to the solution to control the pH at 7.4±0.3. The ionic strength of the solution was not modified.

The separation was performed by measuring the weight of permeate exiting the stirred cell (exiting the bottom of the membrane) as a function of time. This permeate solution was also periodically sampled for BSA concentration. To test the solution for BSA content, a 10 microliter sample was added to 1 ml of bromocresol green ("BCG") reagent (from Sigma Aldrich Company) into a spectrometer cuvette (from Fisher Scientific Company). The cuvette was well-mixed and the adsorbance of the sample was measured using a Perkin-Elmer Lambda 4B UV/VIS spectrophotometer using pure DI water as a blank and a light wavelength of 628 nm. The adsorbance was compared to a standard curve. Knowing the concentration of BSA in the permeate allows one to calculate the protein flux exiting the membrane.

TABLE E

Summary of Porous Carbon Ultrafiltration Membrane Properties as a Function of Precursor Conditions. Labels inside the brackets are as follows: M(PEG MW)-(Sample No.)-(Carbon Mass in grams).

| Example | Synthesis Temp. (° C.) | MW PEG (amu) | Number of Coats | Carbon Weight (mg/cm$^2$) | 1/Water Perm. (Pa m$^2$ s)/mg | 1/BSA Perm. (Pa m$^2$ s)/mg | BSA Retention (%) |
|---|---|---|---|---|---|---|---|
| III.1 [M8000-4-0.015] | 450 | 8000 | 1 | 1.3 | 77.0 | 7692.3 | 95.0 |
| III.2 [M8000-1-0.021] | 500 | 8000 | 1 | 1.9 | 249.5 | 451.3 | 79.8 |
| III.3 [M8000-2-0.018] | 600 | 8000 | 2 | 2.1 | 42.5 | 174.1 | 77.6 |
| III.4 [M8000-5-0.029] | 600 | 8000 | 2 | 2.5 | 23.7 | 258.0 | 87.7 |
| III.5 [M8000-6-0.025] | 600 | 8000 | 2 | 2.2 | 23.5 | 108.2 | 86.3 |
| III.6 [M8000-7-0.074] | 450 | 8000 | 2 | 6.5 | 16362.0 | 11904.8 | 98.3 |
| III.7 [M3400-4-0.015] | 600 | 3400 | 1 | 1.3 | 737.2 | 2829.7 | 87.5 |
| III.8 [M3400-5-0.013] | 600 | 3400 | 1 | 1.1 | 202.9 | 497.5 | 92.4 |

FIG. 22 presents the transient integral molar flow, proportional to the weight of the collection vessel, as a function of separation time. The data points falling on the dotted curve correspond to an experiment run with pure water above the membrane. Here the integral flow increases steadily with time, with the rate of increase becoming constant at long times (i.e., t greater than 500 min). At steady state, the slope of this linear region is the steady state flux which can be used to calculate the hydropermeability of the carbon membrane. The points falling on the solid line correspond to the same experiment performed using a mixture of 10 g/L of BSA in DI water as prepared above. Here, the flow increases as before until about 100 min where the response exhibits an inflection point and the rate of increase falls to the new steady state flux under separation conditions. This decrease in the flux is attributed to membrane fouling and is explored more thoroughly below. Similar decreases in flux have been observed in other ultrafiltration processes. See Clark and Bansal (1991), *Protein Adsorption and Fouling in Ceramic Ultrafiltration Membranes*, Journal of Membrane Science, 55, pp. 21–38; Ho and Zydney (1999), *Effect of Membrane Morphology on the Initial Rate of Protein Fouling During Microfiltration*, Journal of Membrane Science, 155, pp. 261–275; Dejmek and Nilsson (1989), *Flux-Based Measures of Adsorption to Ultrafiltration Membranes*, Journal of Membrane Science, 40, pp. 189–197. During the course of the experiment, BSA retention was observed as in Table A. This retention factor was calculated as:

$$RF = 100 * \left(1 - \frac{C_P}{C_R}\right) \quad (4)$$

where $C_P$ and $C_R$ are the concentrations of BSA (g/L) in the permeate and retentate respectively. During the experiment, the concentration of BSA in the retentate increased markedly from the 10.0 g/L. Mass balances on the BSA in solution and water were generally closed with less than 4% error. The separation, i.e., retention of BSA, is attributed to the carbon within the support based upon clean support experiments that followed the same procedure as above. FIG. 23 is the integral permeate flux of water and BSA through the bare support. Transport through the bare support is rapid and no significant fouling or BSA retention is observed with permeation time. The permeability value of $2.36 \times 10^{-5}$ mol/m²/s/Pa measured from FIG. 23 is in close agreement with the support manufacture's value of $1.57 \times 10^{-5}$ mol/m²/s/Pa.

Example IV
Comparison with Existing Membranes

TABLE F below is a comparison of the mass transfer resistance of various ultrafiltration membranes and the supported porous carbon membranes of the present invention. The examples used in this comparison were identical to those described above in Example II. While all the membranes shown in TABLE F are capable of separating BSA from water at rejection coefficients greater than 95 percent under similar conditions, the membranes vary considerably in the net throughput of solution that can be passed through the membrane. The pure water mass transfer resistance was calculated as the inverse of the hydraulic permeability of the inverse of the water flux divided by the driving force pressure.

MEMBRALOX™ inorganic ultrafiltration membranes have retention properties similar to the AMICON™ polymeric membranes. However, the processing capabilities of these membranes are limited by their relatively high mass transfer resistances. When comparing membranes of similar selective behavior, the templated carbon membranes according to the present invention have been prepared with resistances of one to two orders of magnitude higher than their ceramic counterparts.

TABLE F

Comparison of Hydraulic Mass Transfer Resistance with Commercial Membranes

| Example | Membrane Material | Mean Pore Size or MW Cutoff | Pure Water Resistance (m² s Pa/mg) | Reference |
|---|---|---|---|---|
| II.6 [M8000-7-0.074] | Templated Carbon 6.5 mg/cm² | 44 nm | 16,362 | Present Invention |
| II.1 [M8000-4-0.015] | Templated Carbon 1.25 mg/cm² | — | 77 | Present Invention |
| Macroporous Support | Stainless Steel | 200 nm | 2 | Present Invention |
| MEMBRALOX 1 | Ceramic | 100 nm | 271 | 1 |
| MEMBRALOX 2 | Ceramic | 35 nm | 1915 | 1 |
| MEMBRALOX 3 | Ceramic | 4 nm | 4675 | 1 |
| AMICON PM-30 | Polysulfone | 30 kDa | 0.26 | 2 |
| AMICON YM-30 | Cellulose | 30 kDa | 1.35 | 2 |
| AMICON UM-100 | Polyion Complex | 10 kDa | 1.90 | 2 |

References: 1. Clark and Bansal (1993), Protein Adsorption and Fouling in Ceramic Ultrafiltration Membranes, Journal of Membrane Science, 55, pp. 21–38.
Reihanian and Robertson (1983), Mechanisms of Polarization and Fouling of Ultrafiltration Membranes by Proteins, Journal of Membrane Science, 16, pp. 237–258.

Example V
Preferential Adsorption onto Membrane Surface

The effective pore size of the membrane makes it ideal to retain many types of proteins and other macromolecular species having a kinetic diameter greater than about 1 nm. Generally, the retention mechanisms vary considerably from adsorption of solutes on the membrane surface, pore blocking or plugging, concentration polarization, and gel layer formation. The relationship between the dominance of these mechanisms and the morphology and characteristics of the membrane is poorly understood. See van den Berg and Smolders (1989), *The Boundary-Layer Resistance Model for Unstirred Ultrafiltration. A New Approach*, Journal of Membrane Science, 40, pp. 149–172. Porous carbons are known to posses very high internal surface areas—from adsorbate monolayer adsorption, typically about 1000 m²/g—and thus can block macromolecular components through the high adsorption affinity of the carbon. See Foley (1995) at 407–433. For example, due to the high protein adsorption of the carbon layer, BSA readily surface adsorbs onto the porous carbon layer of the ultrafiltration membranes prepared according to this invention. Consequently, the preferential adsorption can be used to generally inhibit permeation of a desired component.

FIG. 24 is an equilibrium adsorption isotherm of BSA in aqueous solution over a supported porous-carbon ultrafiltration membrane prepared according to the invention measured at 4° C. The isotherm was obtained by equilibrating buffered, pH-controlled solutions of BSA in water, as described above, with supported porous carbon ultrafiltration membrane material as prepared according to the invention. The PFA/PEG carbon membrane used in this example had a PFA to PEG weight ratio of 25:75 wt %, the molecular weight of the PEG was 8000 amu, and the coated support was pyrolyzed at 850° C. for 2 hours.

Samples of the bulk solution were taken as a function of time. The BSA samples were placed in individual vials having an initial BSA concentration that would yield about 1, 2, 4, 5, 7, 8, and 10 g/L of BSA after equilibration. The solution external to the membrane material was tested for BSA concentration quantitatively using the method described above. Readings taken as a function of time generally exhibited a decreasing trend of BSA concentration above the carbon samples as adsorption equilibrium was obtained on the time scale of several days.

Despite the limitations of such an analysis, the isotherm was regressed to a Langmuir form of the type:

$$\frac{A}{(C_o - C)V} = \frac{1}{U} = \frac{1}{U_{sat}}\left(\frac{1}{BC} + 1\right) \quad (5)$$

Here:
C=concentration of BSA at equilibration (g/L)
$C_o$=starting concentration of BSA (g/L)
V=volume of solution in the vial (L)
A=equivalent membrane area of sample in vial ($m^2$)
U=adsorption uptake of BSA per unit membrane area (g BSA/$m^2$)
$U_{sat}$=Saturation uptake of BSA per unit membrane area (g BSA/$m^2$)
B=Langmuir adsorption parameter (L/g)

The saturation uptake from the plot was found to be 10.4 g BSA/$m^2$, slightly higher than the value of 8.4 g BSA/m2 regressed from BSA adsorption data obtained using a 4 nm pore size MEMBRALOX™ membrane from Clark and co-workers. See Clark and Bansal (1991), *Protein Adsorption and Fouling in Ceramic Ultrafiltration Membranes*, Journal of Membrane Science, 55, pp. 21–38. Using the known average deposition mass of carbon per support area (16 mg/$cm^2$) and the hard sphere, close packing monolayer density for BSA (~3.6 mg BSA/$m^2$ adsorbate surface) one can calculate an effective adsorption area of the BSA per carbon mass of 17.9 $m^2$/g. The magnitude of this value implies that internal adsorption and pore plugging provide significant contributions to the overall mass transfer resistance and sieving process.

The Langmuir parameter, B, is the ratio of the rates of adsorption and desorption on the adsorbent surface. The 0.50 L/g does not vary considerably from the 0.56 L/g value for ceramic-based membranes. One of ordinary skill in the art would expect the carbon surface, which is generally hydrophobic, to have a low affinity for BSA adsorption and that this should be reflected in the Langmuir parameter value. Surface functionalization of the carbon to manipulate the protein affinity for the membrane surface, that is, change the hydrophobicity, may provide a unique method to tailor sieving coefficients through supported porous carbon membranes.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A supported mesoporous carbon ultrafiltration membrane comprising:
   (a) a support having at least one through-pore; and
   (b) a mesoporous carbon material having a polymeric precursor composition comprising a carbonizing polymer and a noncarbonizing templating polymer attached to the support and filling at least a portion of the at least one through-pore, the mesoporous carbon material in the at least one pore having a pore size distribution mode in the mesoporous range of 2 nm to 50 nm.

2. The supported mesoporous carbon membrane of claim 1, wherein the support is stainless steel.

3. The supported mesoporous carbon membrane of claim 1, wherein the support has a through-pore size of from about 0.1 to 100 μm.

4. The supported mesoporous carbon membrane of claim 1, wherein the support has a through-pore size of about 0.2 μm.

5. The supported mesoporous carbon membrane of claim 1, wherein the membrane has a through-pore size distribution of from about 2 nm to 100 nm.

6. The supported mesoporous carbon membrane of claim 1, wherein the membrane has an effective through-pore size of from about 2 nm to 50 nm.

7. The supported mesoporous carbon membrane of claim 1, wherein the membrane has a maximum operating pressure of 1000 psig.

8. The supported mesoporous carbon membrane of claim 1, wherein the membrane has a maximum operating temperature greater than 200° C.

9. The supported mesoporous carbon membrane of claim 1, wherein the membrane has a water permeance of from $4.4 \times 10^{-08}$ to $2.4 \times 10^{-05}$ g/s/$m^2$/Pa.

10. The supported mesoporous carbon membrane of claim 1, wherein the membrane has a BSA retention greater than 75 percent.

11. The supported mesoporous carbon membrane of claim 1, wherein the membrane has a BSA retention greater than 85 percent.

12. The supported mesoporous carbon membrane of claim 1, wherein the membrane has a BSA retention greater than 95 percent.

13. The supported mesoporous carbon membrane of claim 1, wherein the membrane has a BSA retention greater than 98 percent.

14. The supported mesoporous carbon membrane of claim 1, wherein the membrane is in the shape of a tube.

15. The supported mesoporous carbon membrane of claim 1, wherein the membrane is in the shape of a flat disc.

16. A supported mesoporous carbon ultrafiltration membrane comprising a mesoporous carbon material and a support, the mesoporous carbon material having a polymeric precursor composition comprising a carbonizing polymer and a noncarbonizing templating polymer, and having a pore size distribution mode in the mesoporous range of 2 nm to 50 nm, and the support having at least one through-pore in the macroporous range of 0.1 to 100 μm, wherein the at least one through-pore of the support has a pore wall, and said mesoporous carbon material is in contact with at least a portion of the pore wall.

17. The supported mesoporous carbon membrane of claim 16, wherein the support has a plurality of through-pores in the macroporous range of 0.1 to 100 μm, and wherein a portion of the mesoporous carbon material is located within all of the through-pores in the support that are in the macroporous range.

18. The supported mesoporous carbon membrane of claim 16, wherein the mesoporous carbon material is prepared by a process comprising the steps of:

(a) applying a polymeric precursor mixture comprising a carbonizing polymer precursor and a noncarbonizing template polymer precursor to the pore wall of the at least one through-pore of the support to form a coating on said pore wall that at least partially fills said at least one through-pore of the support; and (b) pyrolyzing said coating to form the mesoporous carbon material.

19. The supported mesoporous carbon membrane of claim 18, wherein the carbonizing polymer precursor is poly (furfuryl alcohol) and the noncarbonizing template polymer precursor is poly(ethylene glycol).

20. The supported mesoporous carbon membrane of claim 18, wherein the weight ratio of carbonizing polymer precursor to noncarbonizing template polymer precursor in the polymeric precursor mixture is from about 1:3 to 3:1.

21. The supported mesoporous carbon membrane of claim 16, wherein the membrane is rigid.

22. The supported mesoporous carbon membrane of claim 16, wherein the membrane has a bimodal pore size distribution with two pore size distribution modes, wherein one pore size distribution mode is in the range of from 2 to 100 nm.

23. The supported mesoporous carbon membrane of claim 22, wherein the other pore size distribution mode is less than 2 nm.

24. The supported mesoporous carbon membrane of claim 22, wherein one pore size distribution mode is in the range of from 2 to 50 nm.

25. The supported mesoporous carbon membrane of claim 22, wherein one pore size distribution mode is in the range of 2 to 10 nm.

26. The supported mesoporous carbon membrane of claim 16, wherein at least one pore of the support is completely filled with the mesoporous carbon material.

27. A process for preparing a supported mesoporous carbon ultrafiltration membrane comprising the steps:

(a) applying a polymeric precursor mixture containing a noncarbonizing template polymer and a carbonizing polymer to a portion of a porous support to form a coating of said polymeric precursor mixture on said portion of said porous support, and (b) pyrolyzing the coating in an inert gas atmosphere to obtain a mesoporous carbon material having a pore size distribution mode in the mesoporous range of 2 to 50 nm.

28. A process for separating a substance in a liquid comprising filtering said liquid through the supported mesoporous carbon membrane of claim 1.

29. The process of claim 28, wherein the supported mesoporous carbon membrane is in the form of one or more tubes.

30. A supported mesoporous porous carbon ultrafiltration membrane comprising a mesoporous porous carbon layer having a pore size distribution mode in the mesoporous range of 2 to 50 nm and a porous support, wherein the porous carbon layer is created by depositing a polymeric mixture comprising a carbonizing polymer precursor and a noncarbonizing template polymer precursor on said porous support and then pyrolyzing said polymeric mixture, and wherein the pore size of the porous carbon layer is controlled by varying the molecular weight of the template polymer precursor.

31. A supported mesoporous porous carbon ultrafiltration membrane comprising a mesoporous porous carbon layer having a pore size distribution mode in the mesoporous range of 2 to 50 nm and a porous support, wherein the porous carbon layer is created by depositing a polymeric mixture comprising a carbonizing polymer precursor and a noncarbonizing template polymer precursor on said porous support and then pyrolyzing said polymeric mixture, and wherein the pore size of the porous carbon layer is controlled by varying the amount of the template polymer precursor present in the polymeric mixture.

32. A supported mesoporous carbon ultrafiltration membrane for separating at least one macromolecular substance from a liquid, said membrane comprising:

(a) a support having at least one through-pore which connects a first surface of said support to a second surface of said support; and (b) a mesoporous carbon material having a polymeric precursor composition comprising
a carbonizing polymer and a noncarbonizing templating polymer attached to at least a portion of at least one of said first surface and said second surface of said support;

wherein said mesoporous carbon material has a pore size distribution mode in the mesoporous range of from 2 nm to 50 nm, and wherein said mesoporous carbon material is also disposed within said at least one through-pore of said support so as to at least partially fill said at least one through-pore of said support.

33. The supported mesoporous carbon membrane of claim 32, wherein the membrane has a pore size distribution mode in the range of 2 to 100 nm.

34. A supported mesoporous carbon ultrafiltration membrane comprising:

(a) a support, said support having a plurality of through-pores in the macroporous region of 0.1 to 100 μm; and (b) a mesoporous carbon material having a polymeric precursor composition comprising
a carbonizing polymer and a noncarbonizing templating polymer, said mesoporous carbon material having a plurality of pores in the mesoporous region of 2 to 50 nm;

wherein said mesoporous carbon material is located within the plurality of pores in said support.

35. The supported mesoporous carbon membrane of claim 34, wherein the membrane has an effective pore size in the range from 2 to 100 nm.

36. The supported mesoporous carbon membrane of claim 34, wherein the membrane has an effective pore size in the range from 2 to 50 nm.

37. The supported mesoporous carbon membrane of claim 34, wherein the membrane has an effective pore size in the range from 10 to 30 nm.

* * * * *